(12) United States Patent
Farneman

(10) Patent No.: US 11,780,749 B2
(45) Date of Patent: *Oct. 10, 2023

(54) ELECTROMAGNETIC ENERGY SYSTEM FOR THE BREAKDOWN AND DESTRUCTION OF ORGANIC WASTE

(71) Applicant: John Otis Farneman, Powell, OH (US)

(72) Inventor: John Otis Farneman, Powell, OH (US)

( * ) Notice: Subject to any disclaimer, the term of this patent is extended or adjusted under 35 U.S.C. 154(b) by 173 days.

This patent is subject to a terminal disclaimer.

(21) Appl. No.: 17/118,580

(22) Filed: Dec. 10, 2020

(65) Prior Publication Data

US 2022/0185704 A1  Jun. 16, 2022

(51) Int. Cl.
*C02F 1/30* (2023.01)
*C02F 101/30* (2006.01)

(52) U.S. Cl.
CPC .......... *C02F 1/302* (2013.01); *C02F 2101/30* (2013.01)

(58) Field of Classification Search
CPC ............. B02C 19/0075; B02C 19/186; B02C 2023/165; B02C 23/14; B02C 23/16; B02C 19/18; B02C 21/00; B02C 19/16; B02C 2019/183; B02C 23/00; B09B 3/0075; C02F 1/302; C02F 2101/30; C02F 2101/32; Y02W 30/62; B01J 19/006; B01J 19/08; B01J 19/12; B01J 2219/00484; B01J 2219/00941; B01J 2219/00763; B01J 2219/077; B07B 1/28
USPC .................................................. 588/301, 310
See application file for complete search history.

*Primary Examiner* — Magali P Slawski
*Assistant Examiner* — Brad Gordon
(74) *Attorney, Agent, or Firm* — Thomas Y. Kendrick; Benjamen E. Kern; Kern Kendrick LLC

(57) ABSTRACT

A microwave applicator box for breakdown of organic waste materials, is provided comprising: an interior defined by at least one wall; a plurality of inclined grates in an alternating arrangement, including: a first grate extending from a first direction, and a second grate extending from a second direction and underlapping the first grate; vibration devices connected to the grates by arms; wherein the area above the first grate is defined as a Zone A and wherein the area below the first grate and above the second grate is defined as a Zone B; wherein a first waveguide is connected to an opening in the wall in the area of the Zone A; wherein a second waveguide is connected to an opening in the wall in the area of the Zone B; and wherein the interior of the waveguides is in communication with the interior of the microwave applicator box.

20 Claims, 24 Drawing Sheets

ELECTROMAGNETIC ENERGY SYSTEM FOR THE BREAKDOWN AND DESTRUCTION OF ORGANIC WASTE

BACKGROUND

Microwave energy has been used for the breakdown of polymer materials for recycling, destruction, and/or disposal. Use of microwave energy to break down organic materials for recycling, destruction, and/or disposal involves purging a microwave applicator box with an inert gas, such as argon, to avoid ignition of materials within the applicator box upon application of the microwave energy. Current designs of such systems require repeated purging of the applicator box for batch treatment (that is, a batch of feedstock material is added to the box, the box is closed, the box is purged, microwave energy is applied to the material, the box is opened, and the resultant material is removed), or a constant flow of purge gas to maintain a purged environment for systems treating a constant flow of feedstock material. Such systems are wasteful in that the purge gas must constantly be replaced within the applicator box.

What is needed is a system for breaking down polymer materials utilizing microwave energy that conserves purge gas and does not require regular large scale replacement of purge gas during system operation.

SUMMARY

In one aspect, a microwave applicator box for breakdown of organic waste materials is provided, the microwave applicator box comprising: an interior defined by at least one wall; a plurality of inclined grates organized in an alternating arrangement, including: a first grate extending from a first direction within the interior, and a second grate extending from a second direction within the interior and underlapping the first grate; a first vibration device connected to the first grate by a first arm extending through the at least one wall; a second vibration device connected to the second grate by a second arm extending through the at least one wall; wherein the area above the first grate is defined as a Zone A and wherein the area below the first grate and above the second grate is defined as a Zone B; wherein a first waveguide is connected to an opening in the at least one wall in the area of the Zone A; wherein a second waveguide is connected to an opening in the at least one wall in the area of the Zone B; and wherein an interior of the first waveguide and the second waveguide is in communication with the interior of the microwave applicator box.

In another aspect, a microwave organic waste material treatment system is provided, the system comprising: a microwave generator that creates microwave energy; an applicator box for breakdown of organic waste materials, comprising: an interior defined by at least one wall; a plurality of inclined grates organized in an alternating arrangement, including: a first grate extending from a first direction within the interior, and a second grate extending from a second direction within the interior and underlapping the first grate; a first vibration device connected to the first grate by a first arm extending through the at least one wall; a second vibration device connected to the second grate by a second arm extending through the at least one wall; wherein the area above the first grate is defined as a Zone A and wherein the area below the first grate and above the second grate is defined as a Zone B; wherein a first waveguide is connected to an opening in the at least one wall in the area of the Zone A; wherein a second waveguide is connected to an opening in the at least one wall in the area of the Zone B; wherein an interior of the first waveguide and the second waveguide is in communication with the interior of the microwave applicator box; wherein the microwave generator is connected to the first waveguide and the second waveguide; wherein the microwave energy created by the microwave generator travels through the first waveguide and into the Zone A; and wherein the microwave energy created by the microwave generator travels through the second waveguide and into the Zone B.

BRIEF DESCRIPTION OF THE DRAWINGS

The accompanying figures, which are incorporated in and constitute a part of the specification, illustrate various example systems and apparatuses, and are used merely to illustrate various example embodiments. In the figures, like elements bear like reference numerals.

DETAILED DESCRIPTION

Figure 1A:
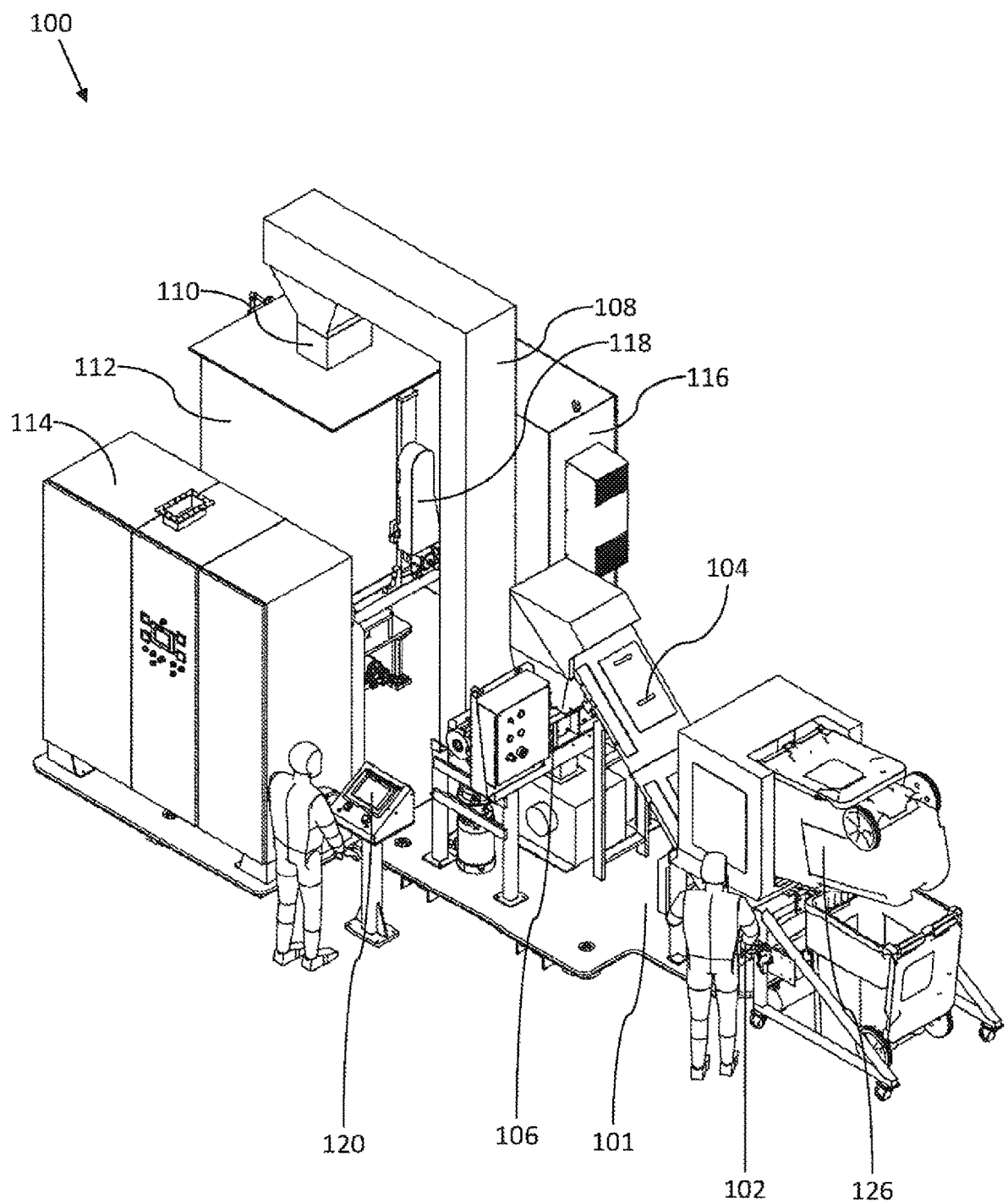
FIG. 1A illustrates a perspective view of a microwave material treatment system 100.
Figure 1B:
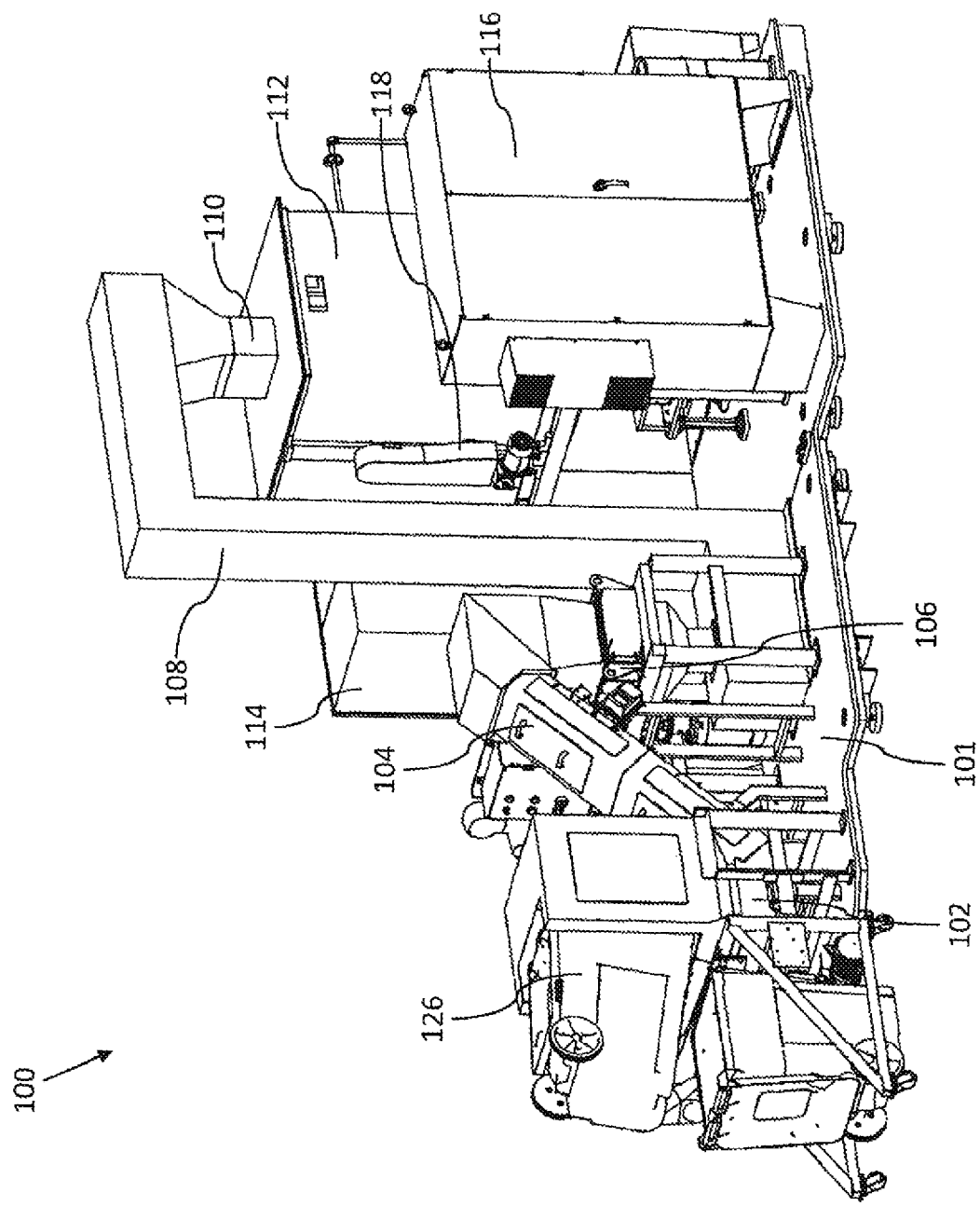
FIG. 1B illustrates a perspective view of microwave material treatment system 100.
Figure 1C:
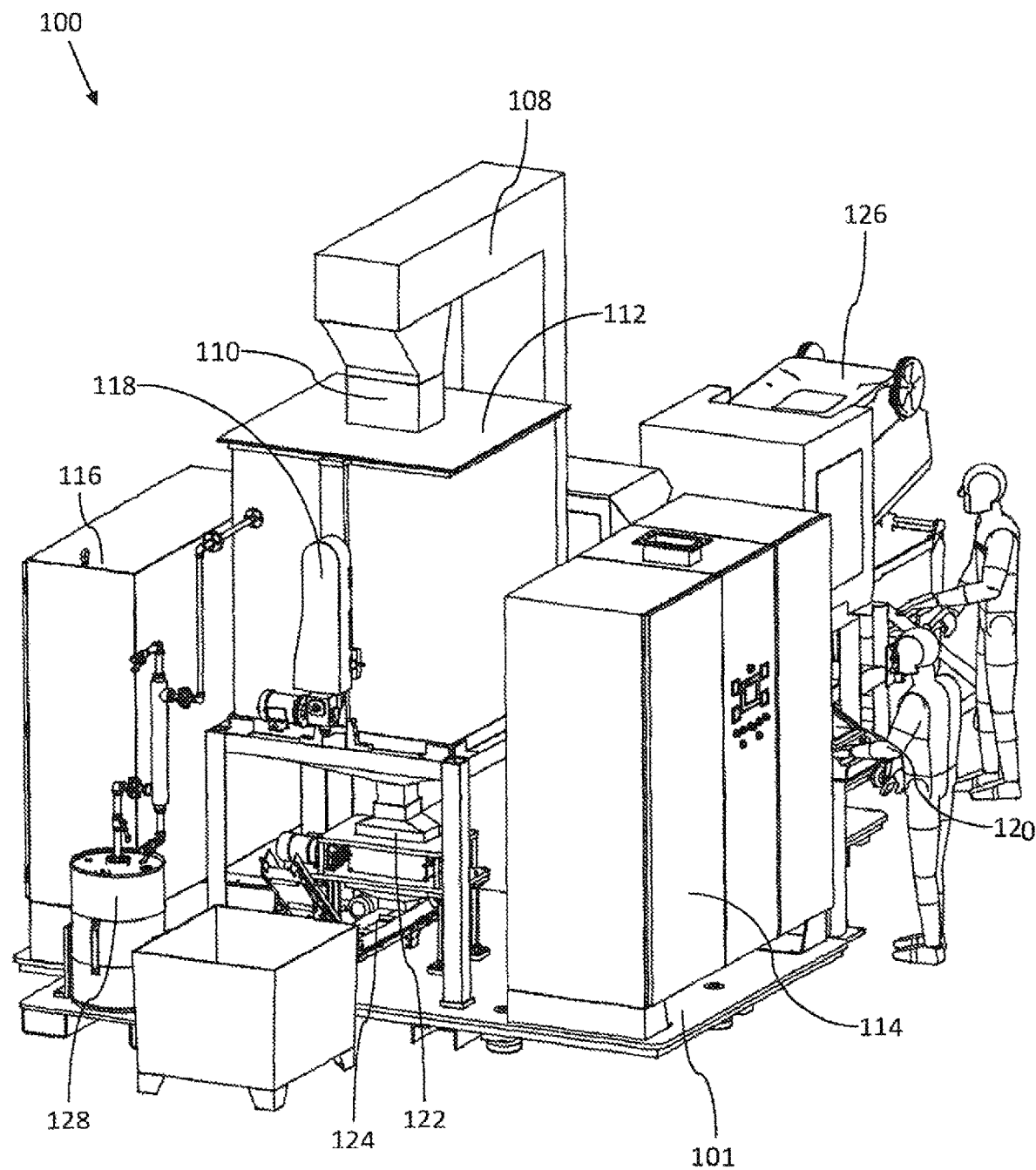
FIG. 1C illustrates a perspective view of microwave material treatment system 100.
Figure 2A:
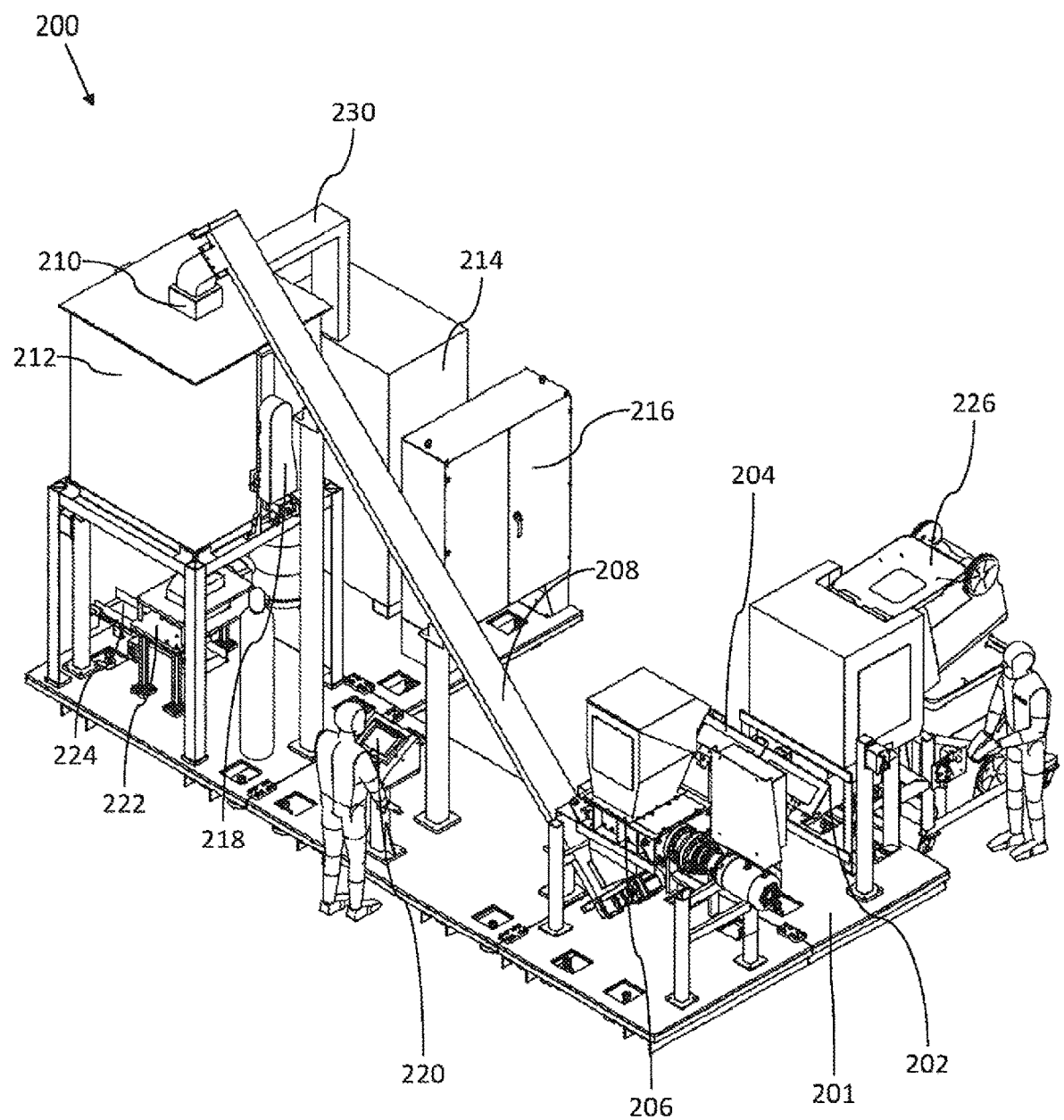
FIG. 2A illustrates a perspective view of a microwave material treatment system 200.
Figure 2B:
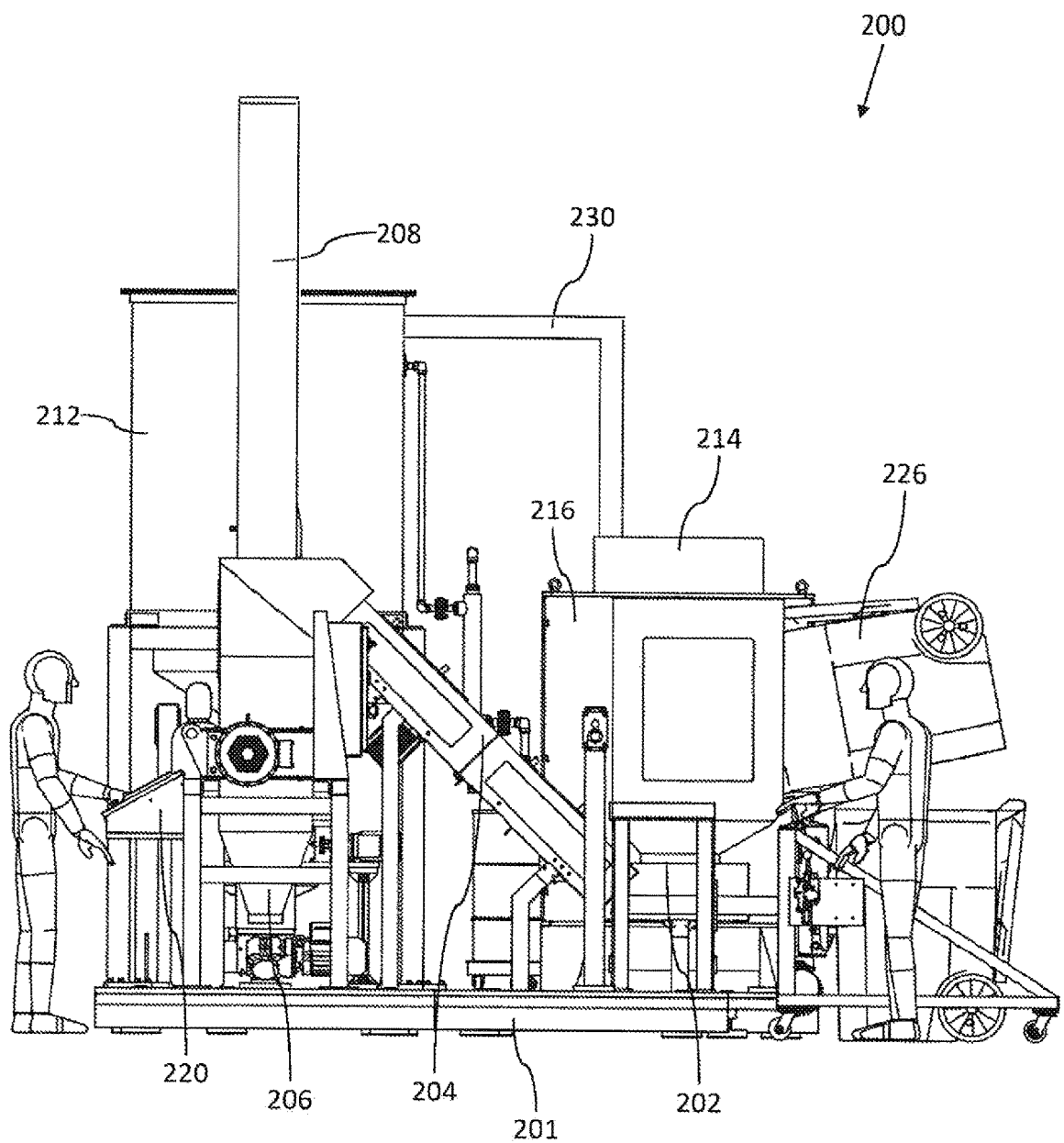
FIG. 2B illustrates an elevation view of microwave material treatment system 200.
Figure 2C:
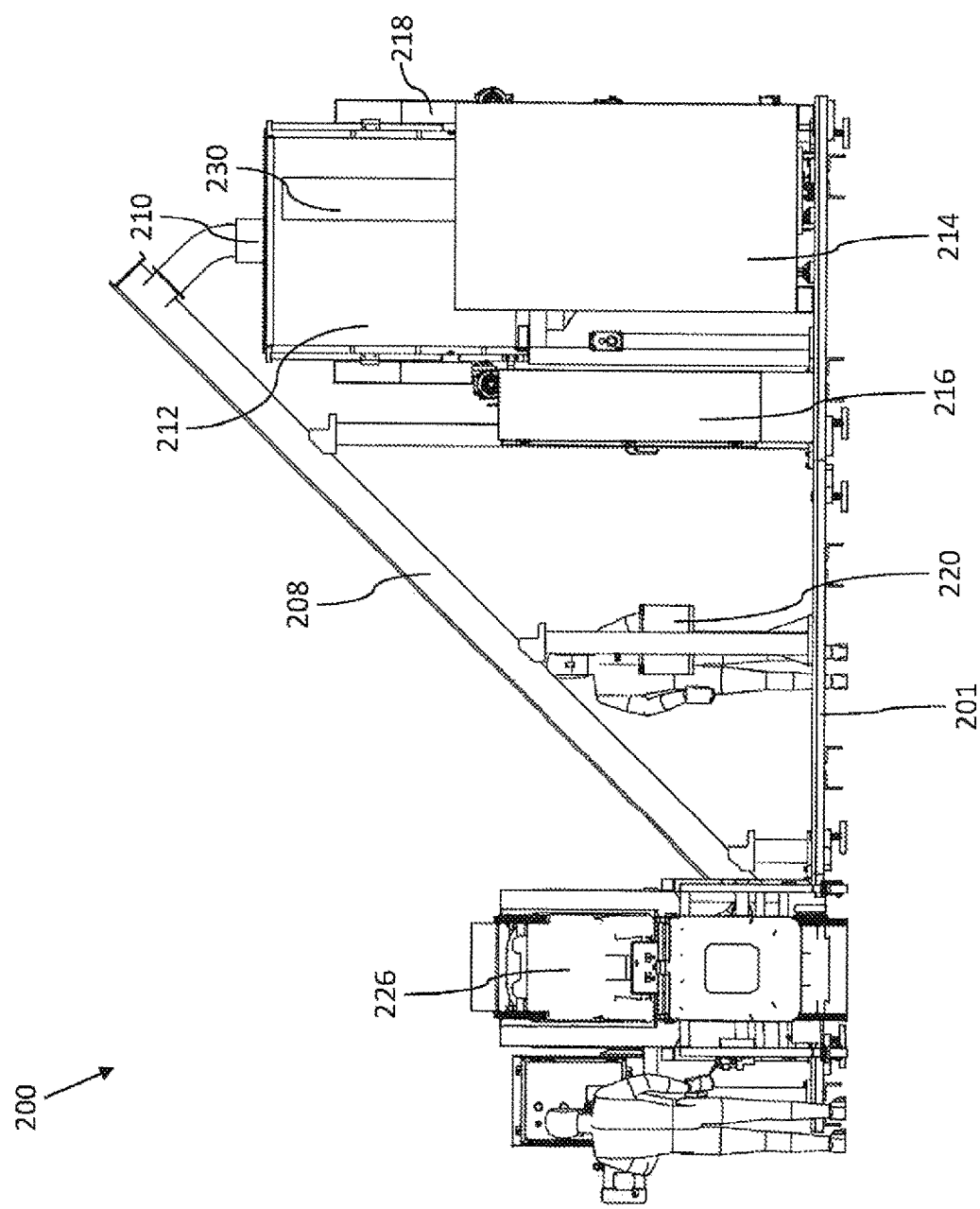
FIG. 2C illustrates an elevation view of microwave material treatment system 200.
Figure 2D:
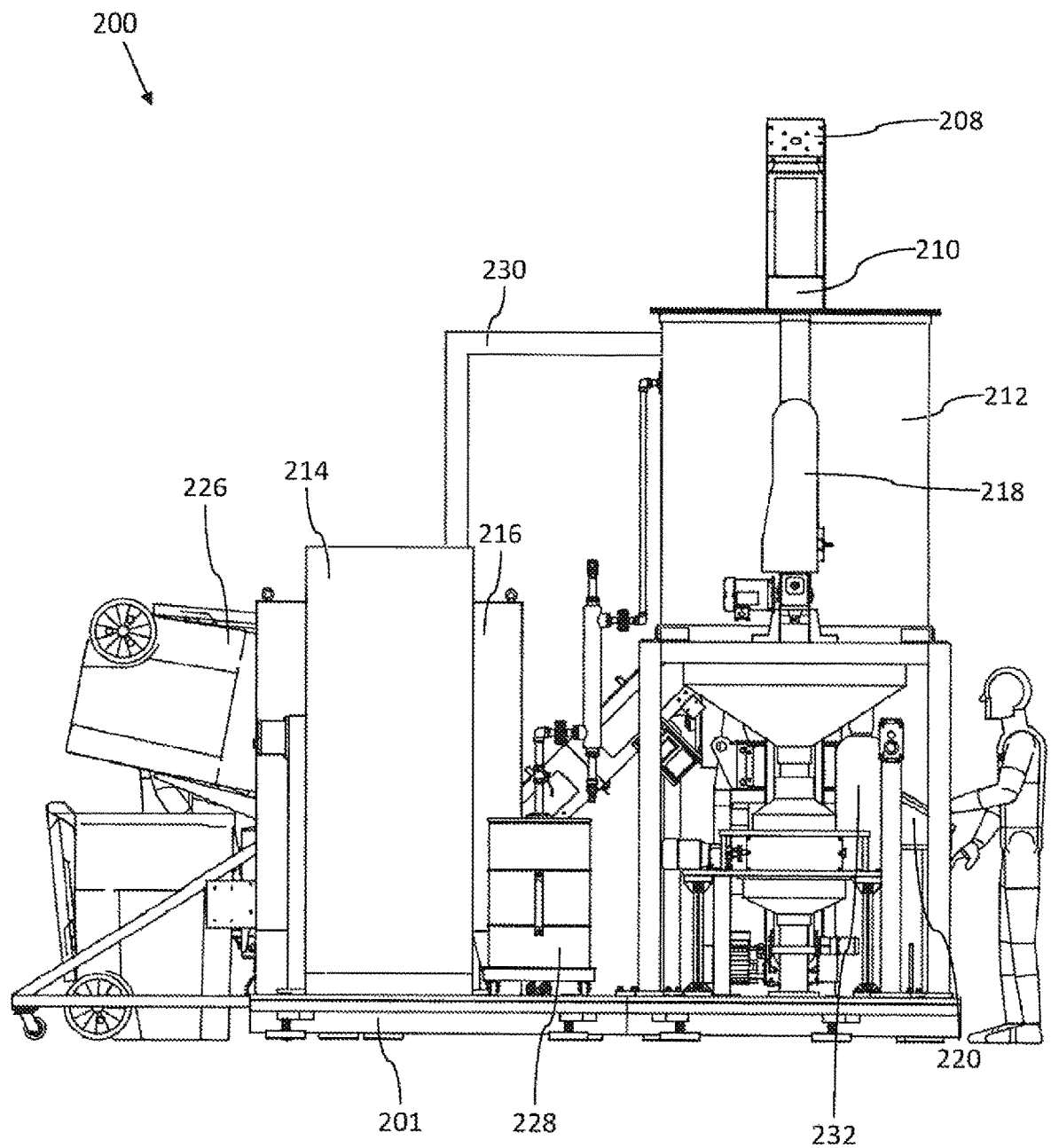
FIG. 2D illustrates an elevation view of microwave material treatment system 200.
Figure 2E:
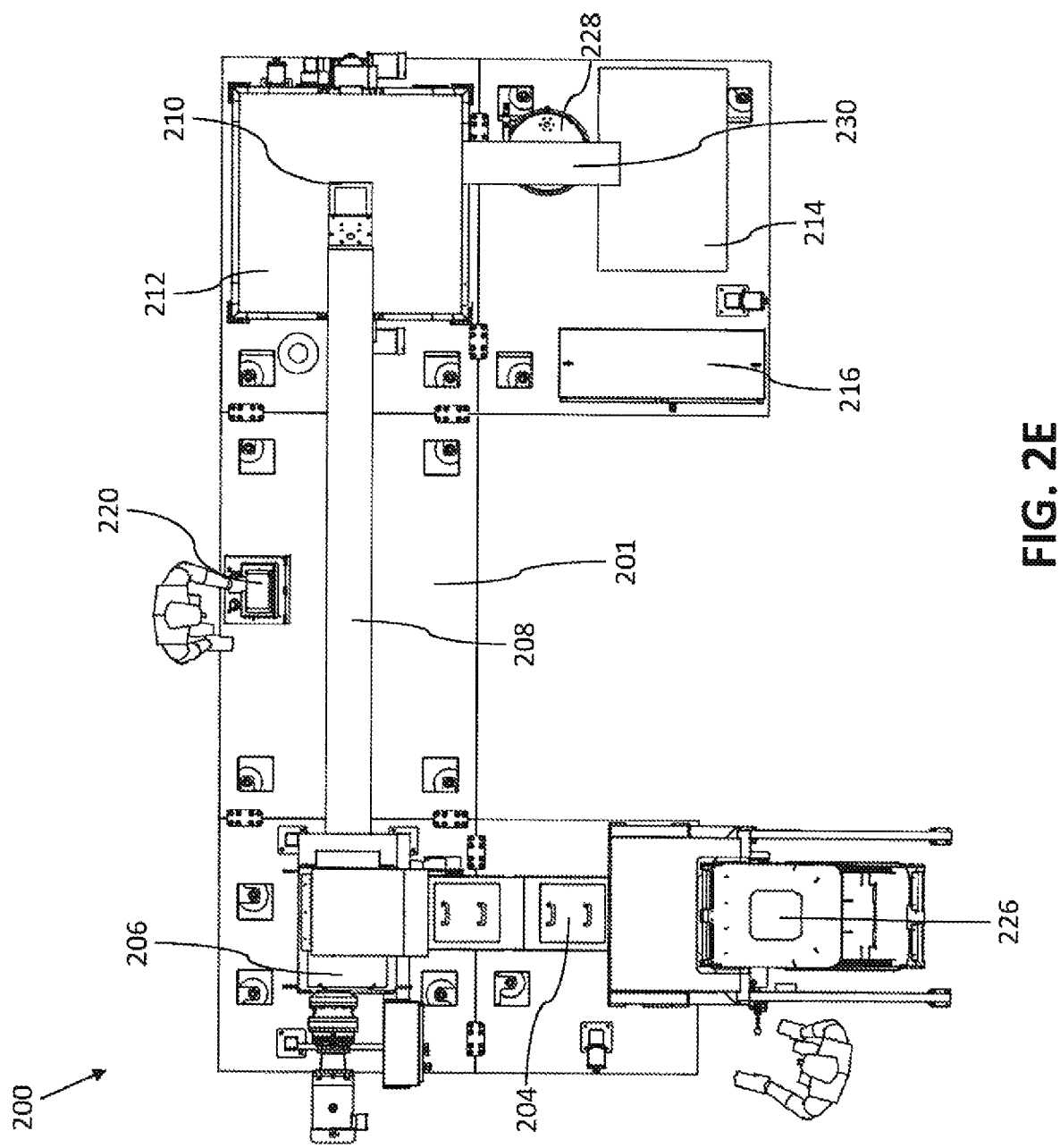
FIG. 2E illustrates a plan view of microwave material treatment system 200.
Figure 2F:
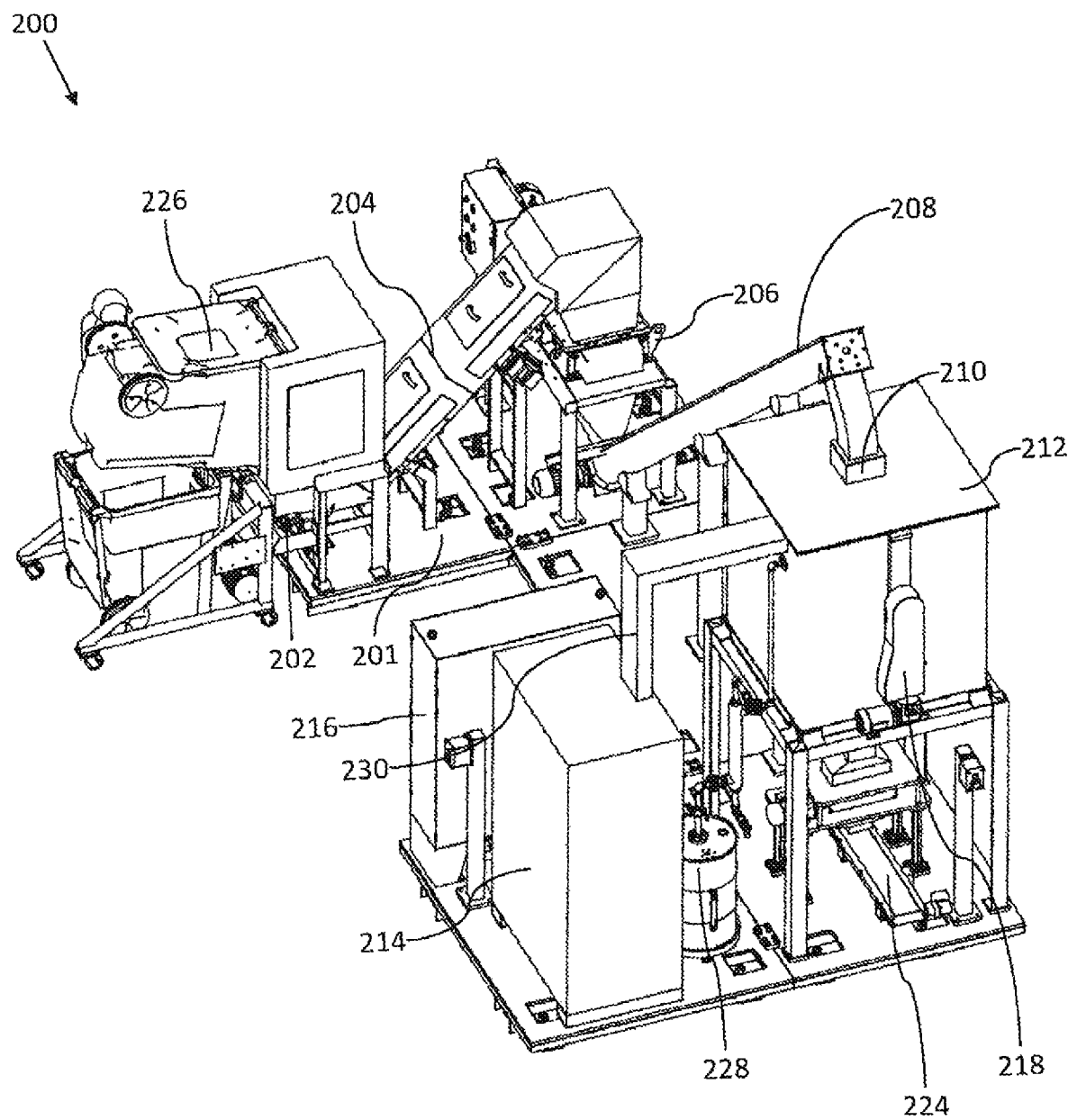
FIG. 2F illustrates a perspective view of microwave material treatment system 200.
Figure 3A:
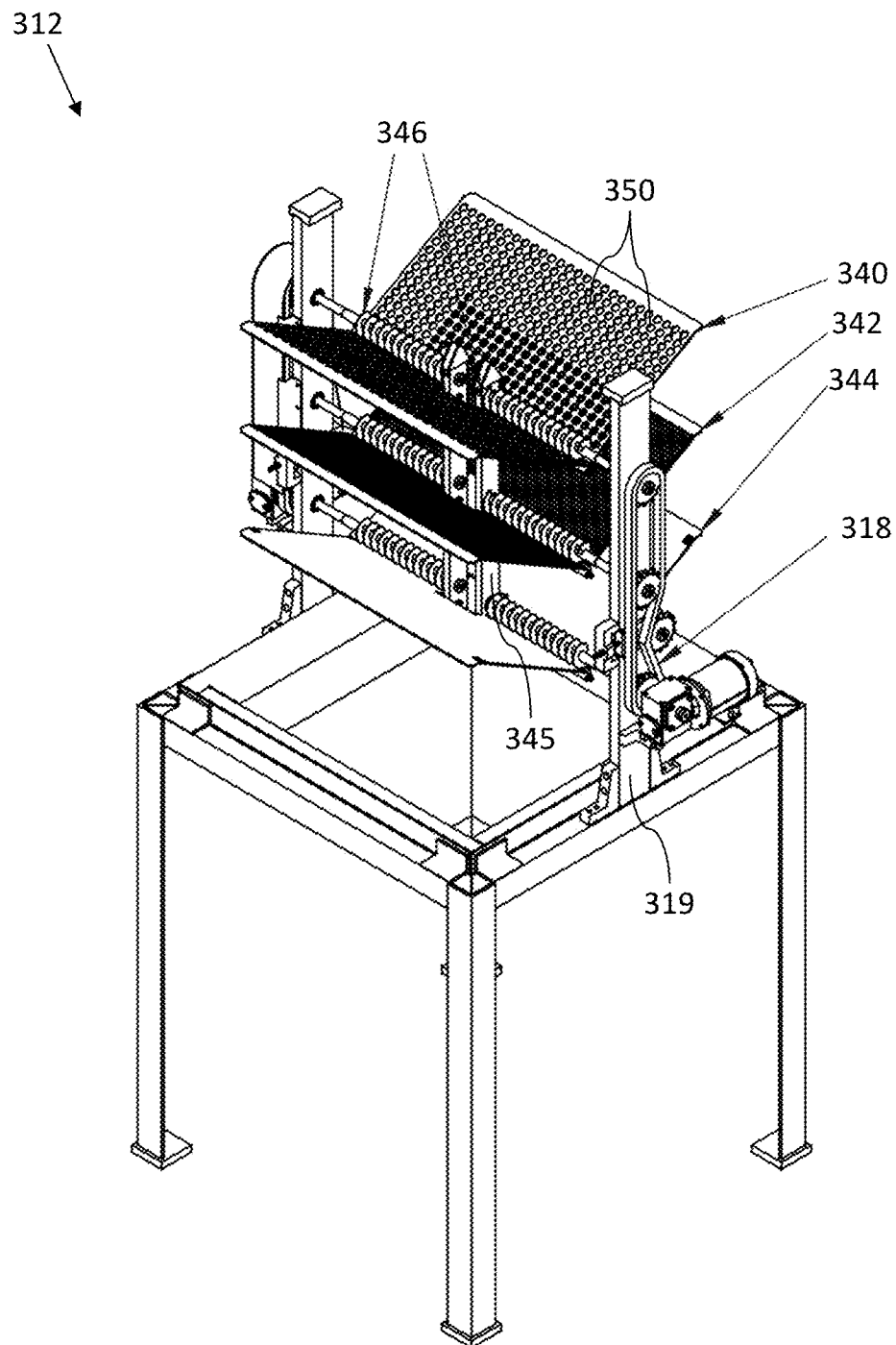
FIG. 3A illustrates a cutaway perspective view of a microwave applicator box 312.
Figure 3B:
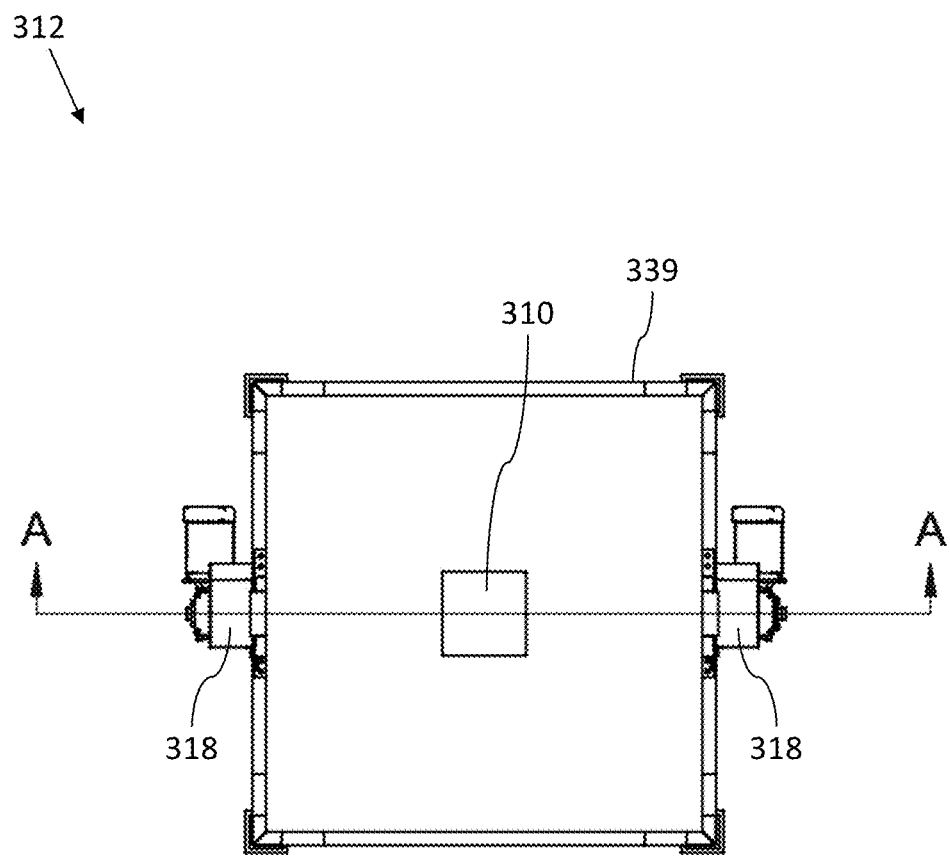
FIG. 3B illustrates a plan view of microwave applicator box 312.
Figure 3C:
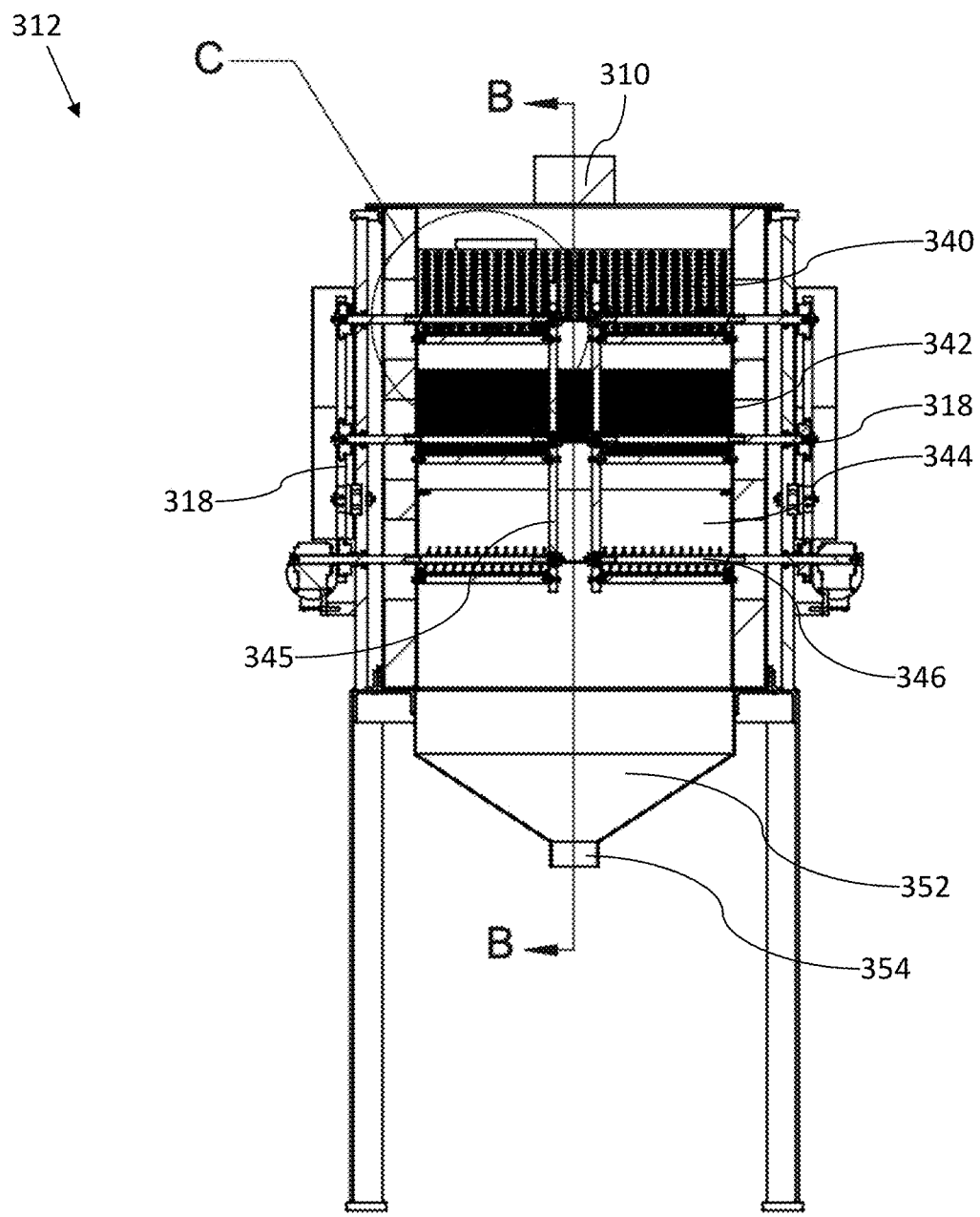
FIG. 3C illustrates a sectional view of microwave applicator box 312 taken along section A-A.
Figure 3D:
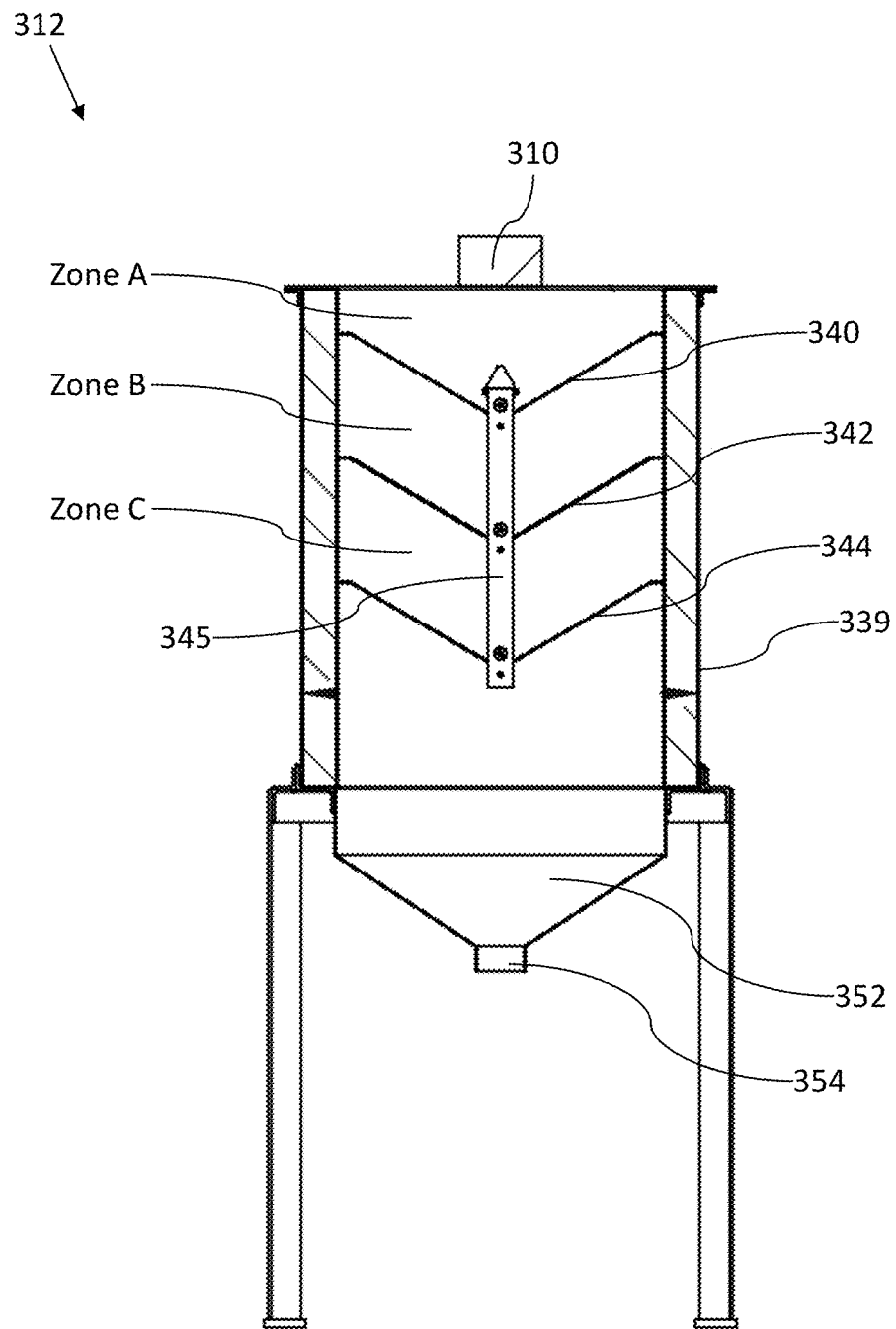
FIG. 3D illustrates a sectional view of microwave applicator box 312 taken along section B-B.
Figure 3E:
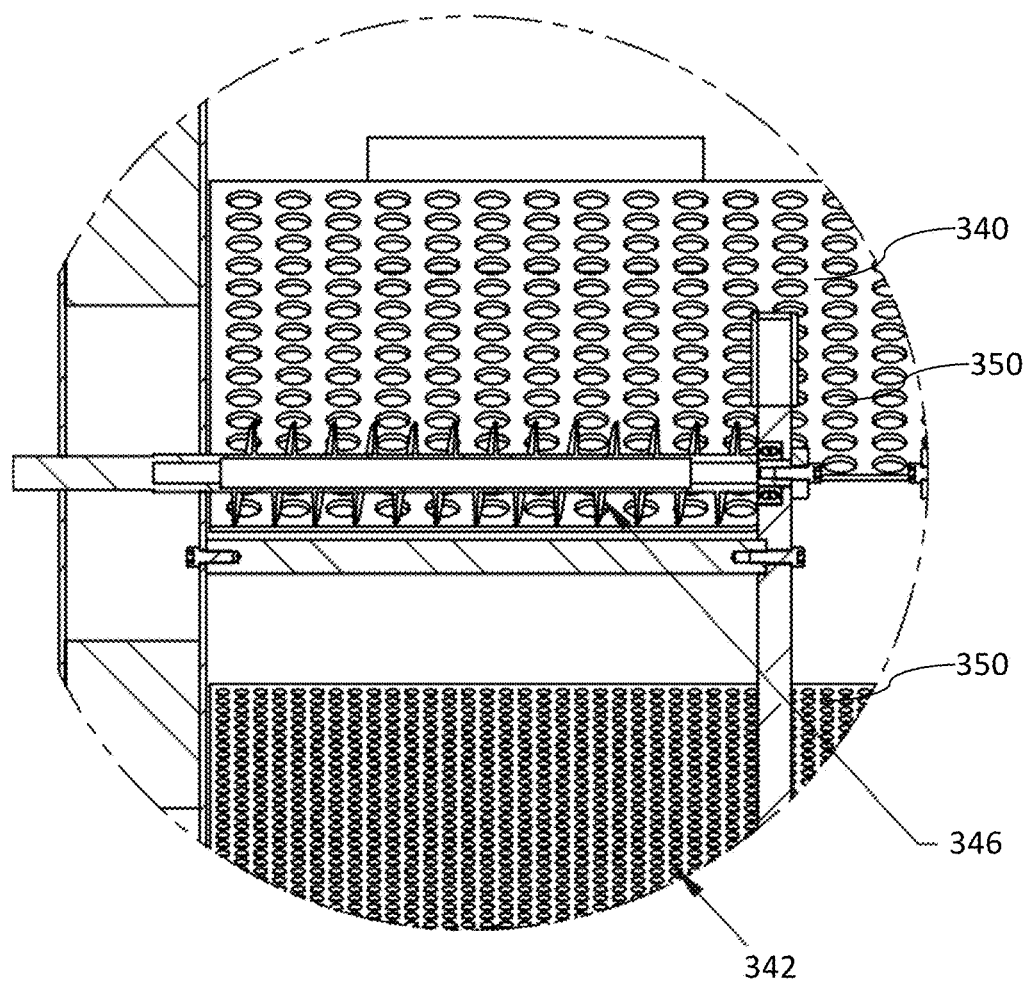
FIG. 3E illustrates a partial view of a grate 340 and a grate 342 of microwave applicator box 312.

FIGS. 1A-1C illustrate a microwave material treatment system 100. System 100 may include a base structure 101, upon which may be supported one or more of a shredder 102, a grinder 106, a microwave applicator box 112, a microwave generator 114, and a power distribution panel 116.

Shredder 102 may receive feedstock material from any of a variety of sources, including for example a bin 126. Bin 126 may be physically dumped into shredder 102 by a human, machine, or automated dump mechanism. Shredder 102 may shred feedstock material into smaller, more uniform (in size, relative to one another) pieces for further processing. Feedstock material may pass through shredder 102 and may thereafter be transported to grinder 106 via a first conveyor 104. First conveyor 104 may be a vacuum conveyor that utilizes a low air pressure (e.g., a vacuum) to transport feedstock material from shredder 102 to grinder 106.

Grinder 106 may receive feedstock directly from first conveyor 104. Grinder 106 may grind feedstock previously shredded by shredder 102, into even smaller, and more uniform (in size, relative to one another) pieces for further processing. Feedstock material may pass through grinder 106 and may thereafter be transported to an inlet valve 110 via a second conveyor 108. Second conveyor 108 may be a vacuum conveyor that utilizes a low air pressure (e.g., a vacuum) to transport feedstock material from grinder 106 to microwave applicator box 112.

Inlet valve 110 may control the passage of feedstock material from second conveyor 108 into the interior of microwave applicator box 112. Inlet valve 110 may meter the flow of feedstock material from second conveyor 108 into the interior of microwave applicator box 112. That is, inlet valve 110 may control the flow rate of feedstock material into microwave applicator box 112. The flow rate of feedstock may be adjusted according to the size, density, material properties, or the like of feedstock pieces, or power of microwaves applied to the interior of microwave applicator box 112. The flow rate of feedstock may be adjusted so as to permit a steady processing of feedstock through microwave applicator box 112 without backing up of feedstock and/or mitigating the wasting of energy that results from passing less feedstock through microwave applicator box 112 than microwave applicator box 112 is capable of processing. The interior and components of applicator box 112 is described in more detail below.

Inlet valve 110 may be any of a variety of valves capable of opening and closing in a manner to control a flow rate of feedstock. Inlet valve 110 may be any of a variety of valves configured to limit the exchange of ambient air (and particularly, oxygen) with an inert purge gas (e.g., argon) contained within the interior of microwave applicator box 112. Inlet valve 110 may be, including without limitation, a rotary drop-through valve, a rotary valve, a rotary airlock valve, or the like.

Microwave generator 114 may create microwave energy. Microwave energy may be directed into the interior of microwave applicator box 112 via waveguides (not shown). Microwave generator 114 may be capable of producing any of a variety of microwave power levels, including for example 75 MW of microwave power.

Processed feedstock material may pass downwardly through microwave applicator box 112 at least in part by manipulation of the feedstock material by augers (oriented within the interior of microwave applicator box 112). The augers may be driven by a chain drive 118 oriented on one or two opposing sides of the outside of microwave applicator box 112. Feedstock material may pass downwardly out of applicator box 112 and into a grinder 122. Grinder 122 may grind the processed feedstock material into even smaller, and more uniform (in size, relative to one another) pieces for further processing. The ground feedstock material exiting grinder 122 may be transferred to a container via a reclamation conveyor 124. Reclamation conveyor 124 may include be a vacuum conveyor. Reclamation conveyor 124 may transport ground feedstock material into a container for removal from system 100.

System 100 may include a condenser 128. Depending upon the nature of the feedstock material, condenser 128 may be used to remove moisture from gas generated by system 100.

Power distribution panel 116 may provide all electrical power to the other various components of system 100. Power distribution panel 116 may be connected to a main electrical power supply to receive electrical power for distribution to the various components of system 100.

System 100 may include a primary control unit 120 that monitors and controls system 100, including activation/deactivation of components, feed rates of conveyors and inlet valve, application of microwave energy and power associated with the microwave energy, inlet of purge gas to the interior of the microwave applicator box, and the like.

FIGS. 2A-2F illustrate a microwave material treatment system 200. System 200 is similar to system 100. Like elements of system 200 have the same reference number suffix (the last two digits of the three digit reference number) as those described above with respect to system 100. For example, shredder 202 is substantially similar to shredder 102, power distribution panel 216 is substantially similar to power distribution panel 116, and so on.

One notable difference in system 200 as compared to system 100 is that primary control unit 220 may be supported by and connected to base structure 201.

System 200 includes a waveguide 230 connecting a microwave generator 214 to a microwave applicator box 212. Waveguide 230 creates an isolated pathway through which microwave energy travels from microwave generator 214 to microwave applicator box 212.

System 200 may include a purge gas tank 232 fluidically connected to the interior of microwave applicator box 212. Purge gas tank 232 may contain an inert purge gas, including for example, argon.

System 200 may include: a base structure 201, a shredder 202, a first conveyor 204, a grinder 206, a second conveyor 208, an inlet valve 210, a microwave applicator box 212, a microwave generator 214, a power distribution panel 216, a chain drive 218, a primary control unit 220, a grinder 222, a reclamation conveyor 224, a bin 226, a condenser 228, a waveguide 230, and a purge gas tank 232.

FIG. 3A-3E illustrates a cutaway perspective view of a microwave applicator box 312, which is substantially similar to microwave applicator box 112, 212. Microwave applicator box 312 may include a plurality of inclined grates 340, 342, 344. Grates 340, 342, 344 may be organized in opposed pairs, so that a pair of inclined grates 340 form a first level, a pair of inclined grates 342 form a second level, and a pair of inclined grates 344 form a third level. It is understood that more or less than three levels are also contemplated. Grates 340, 342, 344 may be inclined in the shape of a "V," such that the outer edges of grates 340, 342, 344 are higher, and the inner edges of grates 340, 342, 344 are lower to form a funnel shape. Alternatively, each of grates 340, 342, 344 is a single grate bent in the shape of a "V" and oriented such that the outer edges are higher than the central point of grate 340, 342, 344.

Microwave applicator box 312 may include at least one stanchion 319. At least one stanchion 319 may support at least one chain drive 318. Chain drive 318 may include a motor configured to drive a chain, which in turn causes augers 346 to turn. Augers 346 may be oriented in a low point of grate 340, 342, 344 within the valley created by grate 340, 342, 344. Augers may be supported at a first end by one or more stanchion 319 and may be supported at a second end by one or more centrally located stanchion 345. Augers 346 may move feedstock material along grates 340, 342, 344 while the feedstock material is being treated with microwave energy. Augers 346 may stir and/or mix feedstock material while the feedstock material is being treated with microwave energy.

Each of grates 340, 342, 344 may include perforations 350 extending through the thickness of each of grates 340, 342, 344. Perforations 350 in an upper, first level grate 340 may be larger than (a larger cross-sectional area, e.g., larger hole diameter) perforations 350 in a central, second level grate 342. Perforations 350 in a central, second level grate 342 may be larger than perforations 350 in a lower, third level grate 344. The space above the upper, first level grate 340 is referred to as Zone A, the space between the central, second level grate 342 and the upper, first level grate 340 is referred to as Zone B, and the space between lower, third level grate 344 and central, second level grate 342 is referred to as Zone C. Feedstock material of a size larger than perforations 350 in an upper, first level grate 340 may enter the interior of microwave applicator box 312 in Zone A where the feedstock material is exposed to microwave energy. As the feedstock material breaks down due to microwave energy treatment, augers 346 may shift, move, mix, and/or stir the feedstock material until it falls through perforations 350 of grate 340 and into Zone B. The feedstock material that falls onto a central, second level grate 342 may be larger than perforations 350 in second level grate 342. As the feedstock material breaks down due to microwave energy treatment, augers 346 may shift, move, mix, and/or stir the feedstock material until it falls through perforations 350 of grate 342 and into Zone C. The feedstock material that falls onto a lower, third level grate 344 may be larger than perforations 350 in third level grate 344. As the feedstock material breaks down due to microwave energy treatment, augers 346 may shift, move, mix, and/or stir the feedstock material until it falls through perforations of grate 344, and into a hopper 352. Accordingly, feedstock material is classified by material size as it falls through first grate 340, second grate 342, and third grate 344, until the feedstock material drops into hopper 352. Feedstock material may exit microwave applicator box 312 via an outlet 354.

Microwave applicator box 312 may include walls 339, forming one or more of the sides, top, and bottom (hopper 352) of microwave applicator box 312. Walls 339 may define and bound the interior of microwave applicator box 312. At least a portion of the interior of microwave applicator box 312, including at least one of the inner surfaces of walls 339, grates 340, 342, 344, stanchions 345, and augers 346 is coated with a carbon nanotube material. The carbon nanotube material coating may eliminate cold spots and help absorb the microwave energy that is not absorbed by the feedstock material.

The interior of microwave applicator box 312 may be substantially devoid or completely devoid of right angles. The interior of microwave applicator box 312 may include welds that are polished smooth and angled at about 45 degrees. Such control of angles may maximize the application of microwave energy inside of microwave applicator box 312 and minimize or mitigate undesired reflection of microwave energy inside of microwave applicator box 312.

The inlet and outlet of feedstock material from microwave applicator box 312 may be controlled so as to create a constant accumulation of feedstock material in the bottom of hopper 352 (on top of outlet 354) so as to create a barrier to minimize, mitigate, or eliminate loss of inert gas out of outlet 354 and entrance of ambient air (particularly, oxygen) through outlet 354 into the interior of applicator box 312 when outlet 354 is opened to remove processed feedstock material.

Figure 4:
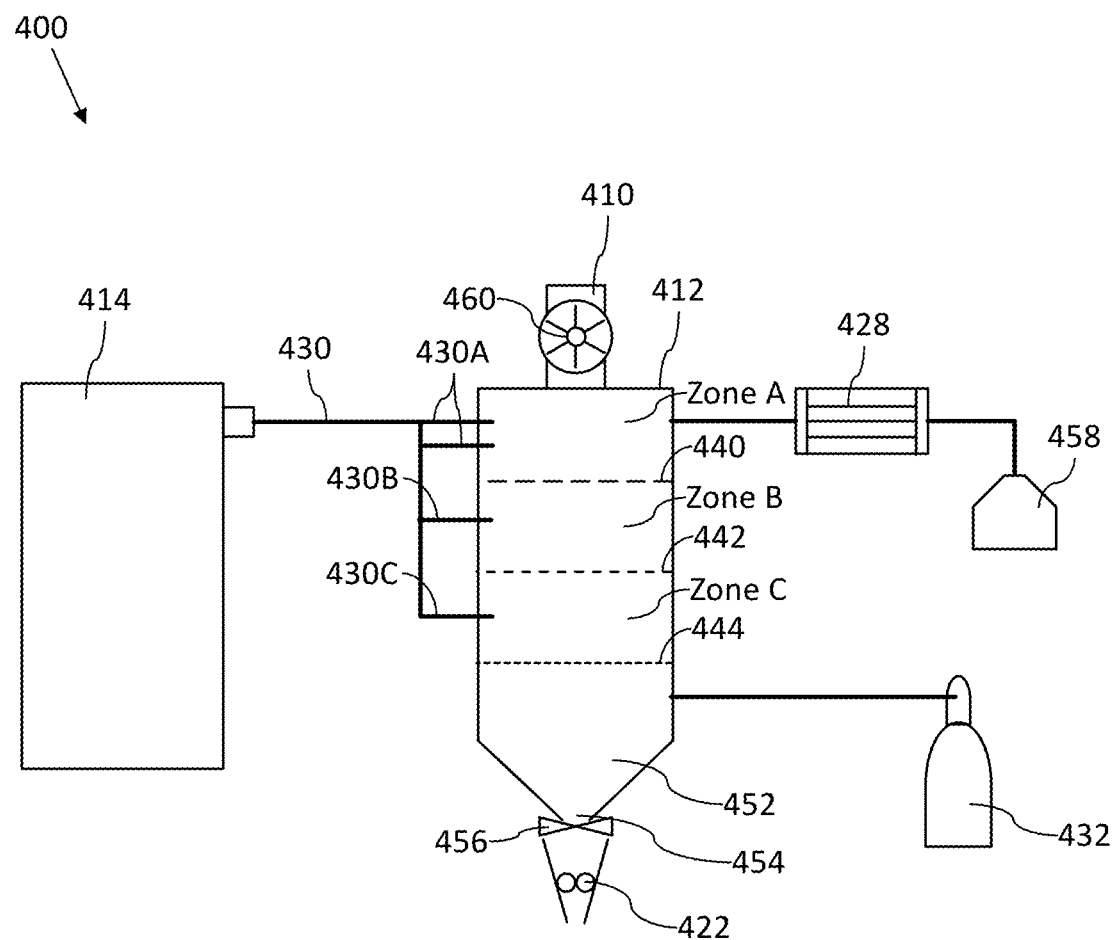
FIG. 4 illustrates a schematic view of a microwave material treatment system 400.

FIG. 4 illustrates a microwave material treatment system 400. System 400 may include a microwave generator 414 for creating microwave energy and a microwave applicator box 412 for processing feedstock material using the microwave energy. Microwave generator 414 is connected to microwave applicator box 412 via at least one waveguide 430.

Microwave applicator box 412 may include an inlet valve 410 that may include a rotary valve body 460. Microwave applicator box 412 may include an upper, first level grate 440, a central, second level grate 442, and a lower, third level grate 444. Wave guide 430 may branch into multiple waveguides, including a bifurcated wave guide 430A directed into the interior of microwave applicator box 412 above first level grate 440 (Zone A) to direct microwave energy to feedstock oriented on first level grate 440. Waveguide 430 may include a branch wave guide 430B directed into the interior of microwave applicator box 412 above second level grate 442 (Zone B) to direct microwave energy to feedstock oriented on second level grate 442. Waveguide 430 may include a branch wave guide 430C directed into the interior of microwave applicator box 412 above third level grate 444 (Zone C) to direct microwave energy to feedstock oriented on third level grate 444.

Microwave applicator box 412 may include a hopper 452 terminating at a lower point in an outlet 454. Outlet 454 may be controlled by an outlet valve 456. Outlet valve 456 may be operated to allow processed feedstock material to exit hopper 452 via outlet 454. Material passing out of outlet 454 may be directed into a grinder 422.

System 400 may include a condenser 428 fluidically connected to microwave applicator box 412 and configured to collect moisture from within microwave applicator box 412. Moisture collected by condenser 428 may be stored in a condenser tank 458.

System 400 may include a purge gas tank 432 containing a purge gas, and fluidically connected to microwave applicator box 412. The purge gas may be an inert gas, such as argon.

Figure 5A:
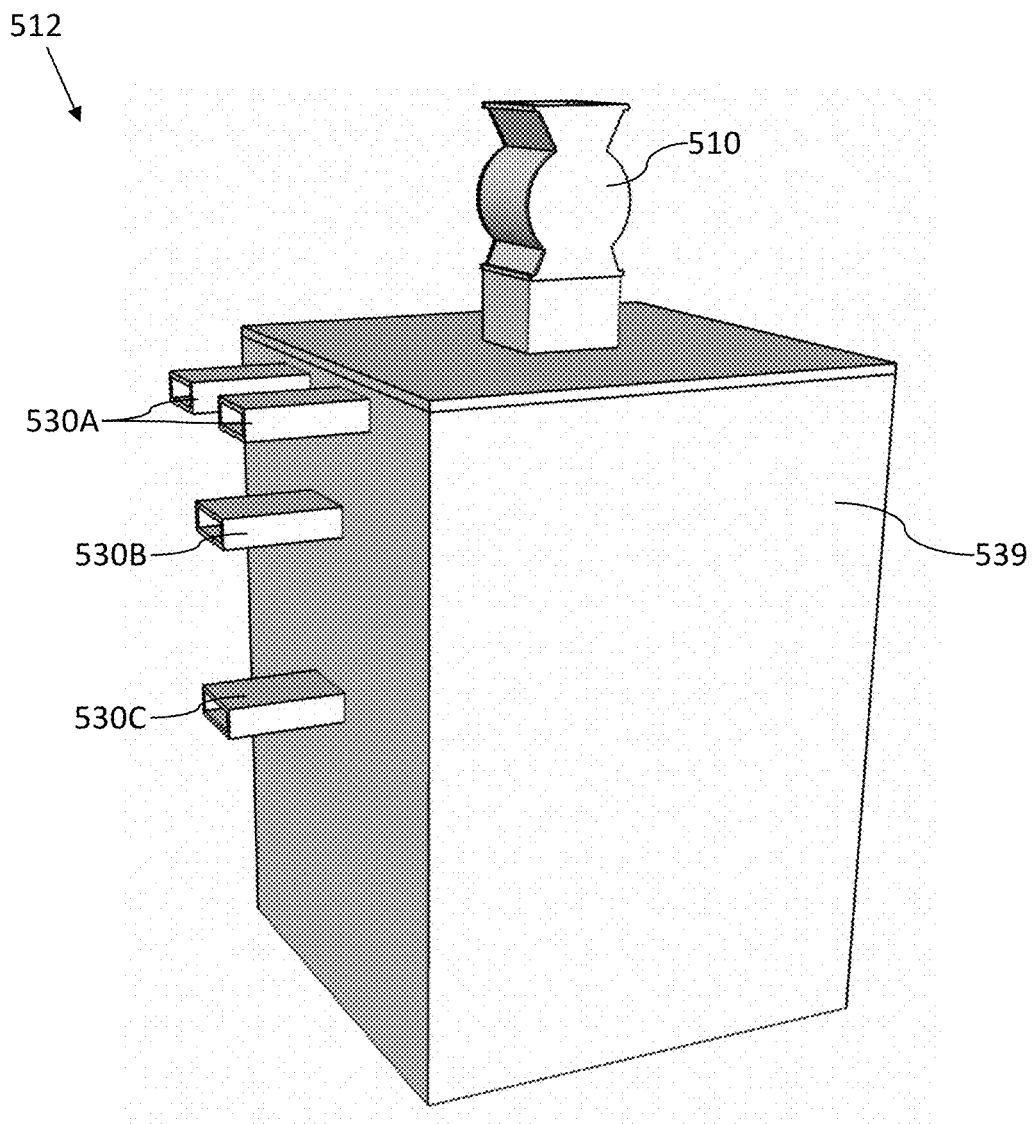
FIG. 5A illustrates a perspective view of a microwave applicator box 512.
Figure 5B:
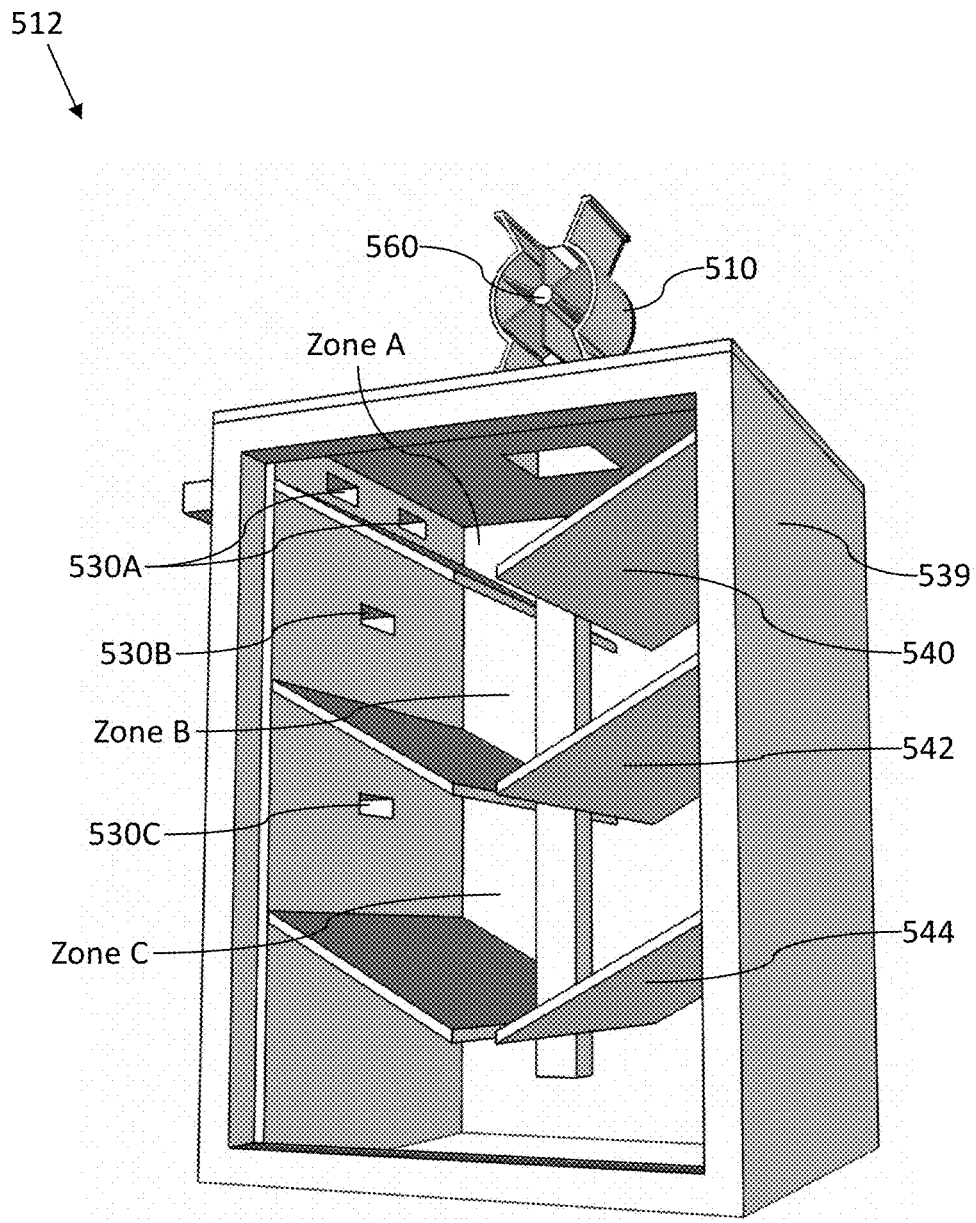
FIG. 5B illustrates a perspective cutaway view of microwave applicator box 512.

FIGS. 5A and 5B illustrate a microwave applicator box 512. Microwave applicator box 512 may include walls 539, forming one or more of the sides, top, and bottom (e.g., hopper 352) of microwave applicator box 512. Microwave applicator box 512 may include an inlet valve 510 that may include a rotary valve body 560.

Microwave applicator box 512 may include an upper, first level grate 540, a central, second level grate 542, and a lower, third level grate 544. A waveguide (such as waveguide 430) may branch into multiple waveguides, including a bifurcated wave guide 530A directed into the interior of microwave applicator box 512 above first level grate 540 (Zone A) to direct microwave energy to feedstock oriented on first level grate 540. The waveguide may include a branch wave guide 530B directed into the interior of microwave applicator box 512 above second level grate 542 but below first level grate 540 (Zone B) to direct microwave energy to feedstock oriented on second level grate 542. The waveguide may include a branch wave guide 530C directed into the interior of microwave applicator box 512 above third level grate 544 but below second level grate 542 (Zone C) to direct microwave energy to feedstock oriented on third level grate 544.

Figure 6A:
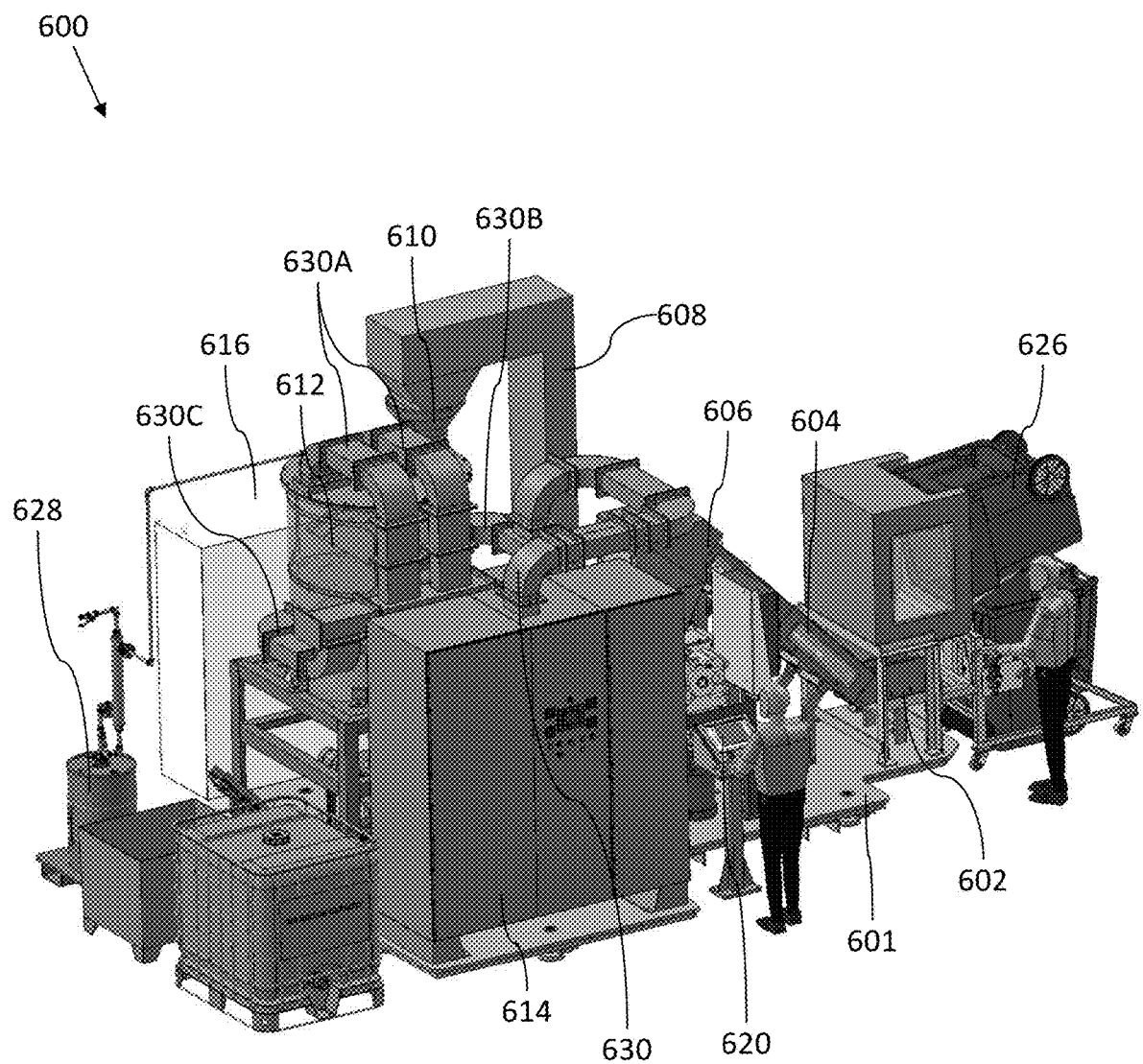
FIG. 6A illustrates a perspective view of a microwave material treatment system 600.
Figure 6B:
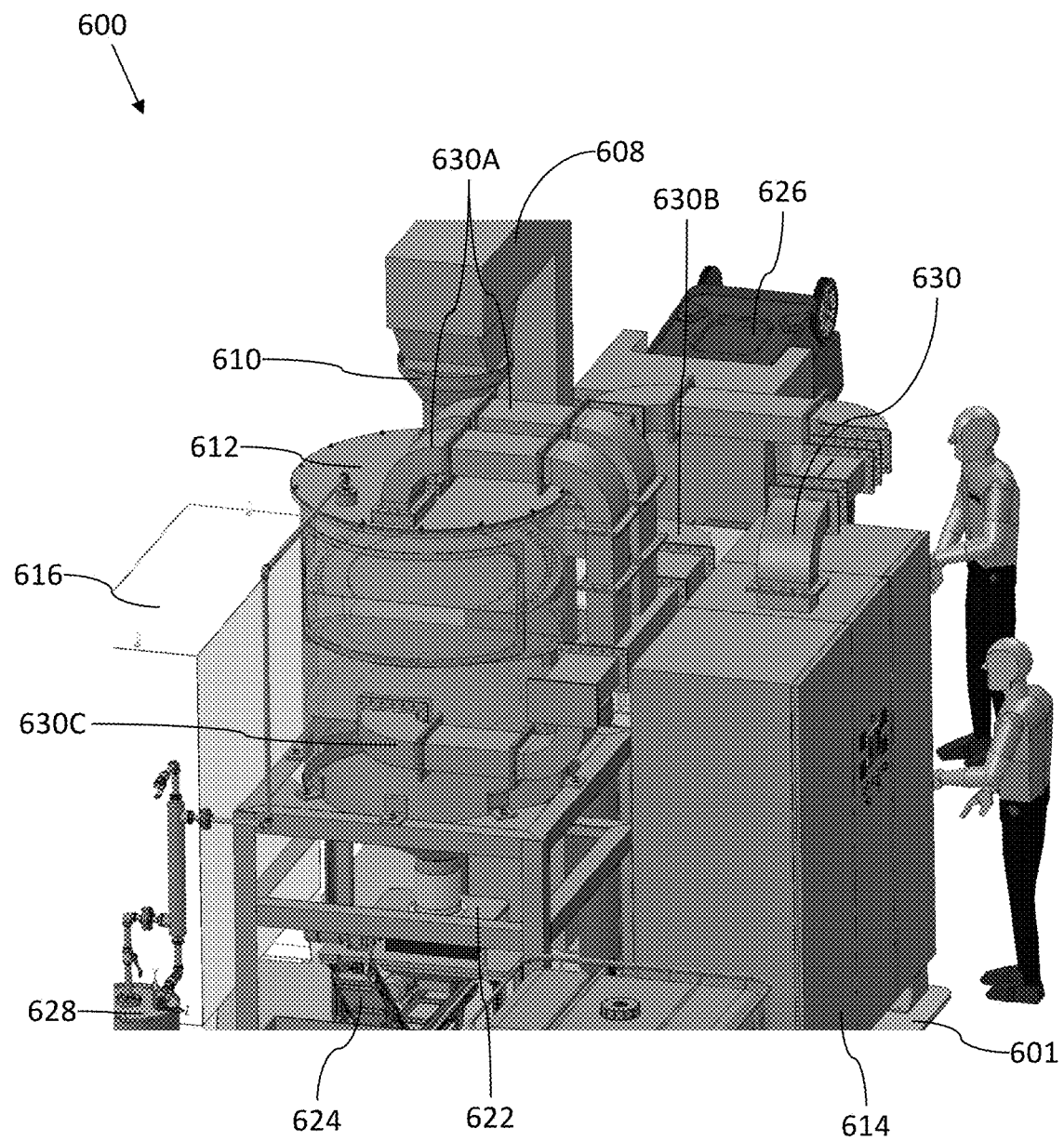
FIG. 6B illustrates a perspective view of microwave material treatment system 600.
Figure 6C:
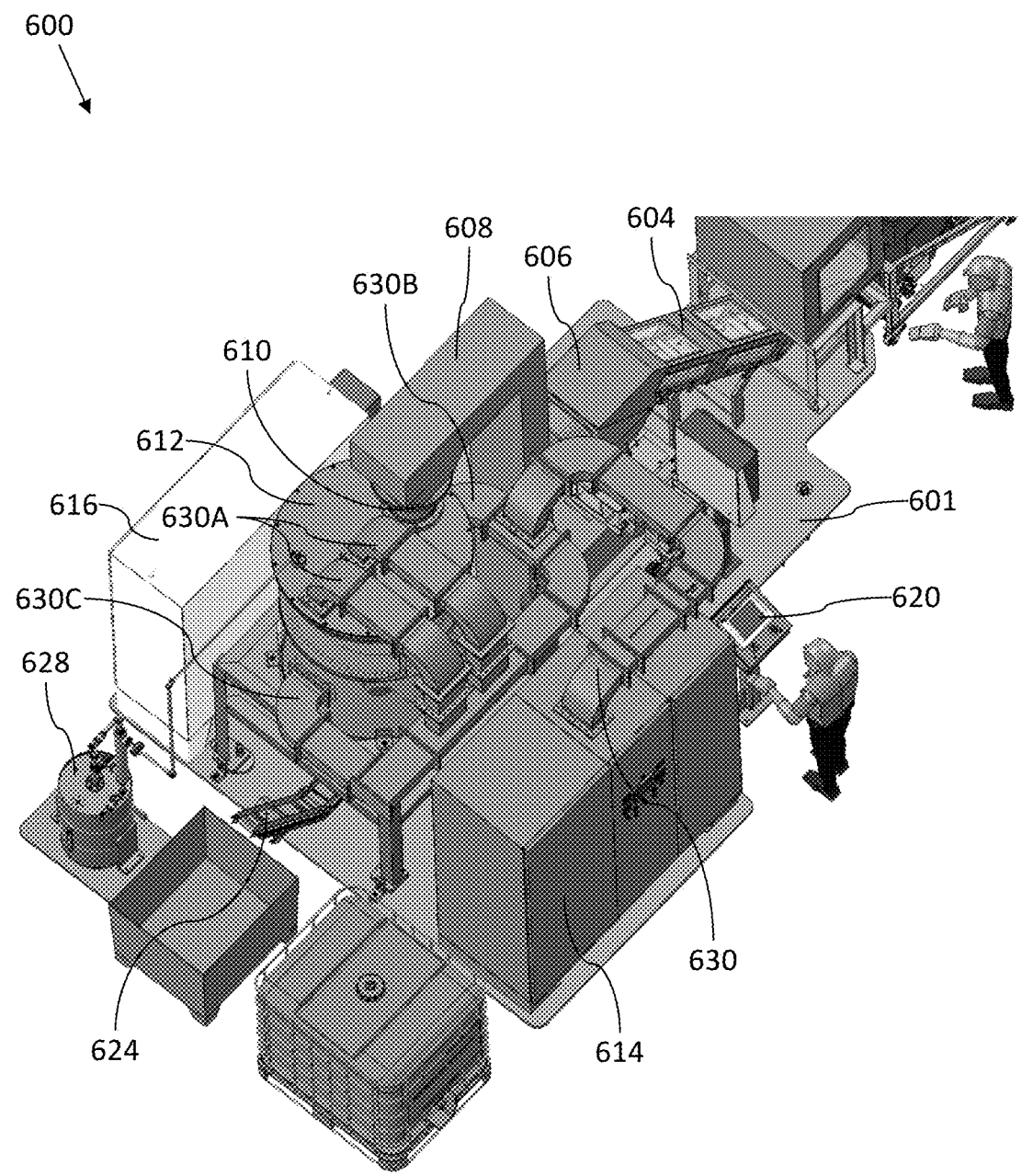
FIG. 6C illustrates a perspective view of microwave material treatment system 600.

FIGS. 6A-6C illustrate a perspective view of a microwave material treatment system 600. System 600 is similar to system 100. Like elements of system 600 have the same reference number suffix (the last two digits of the three digit reference number) as those described above with respect to system 100. For example, shredder 602 is substantially similar to shredder 102, power distribution panel 616 is substantially similar to power distribution panel 116, and so on.

Figure 7A:
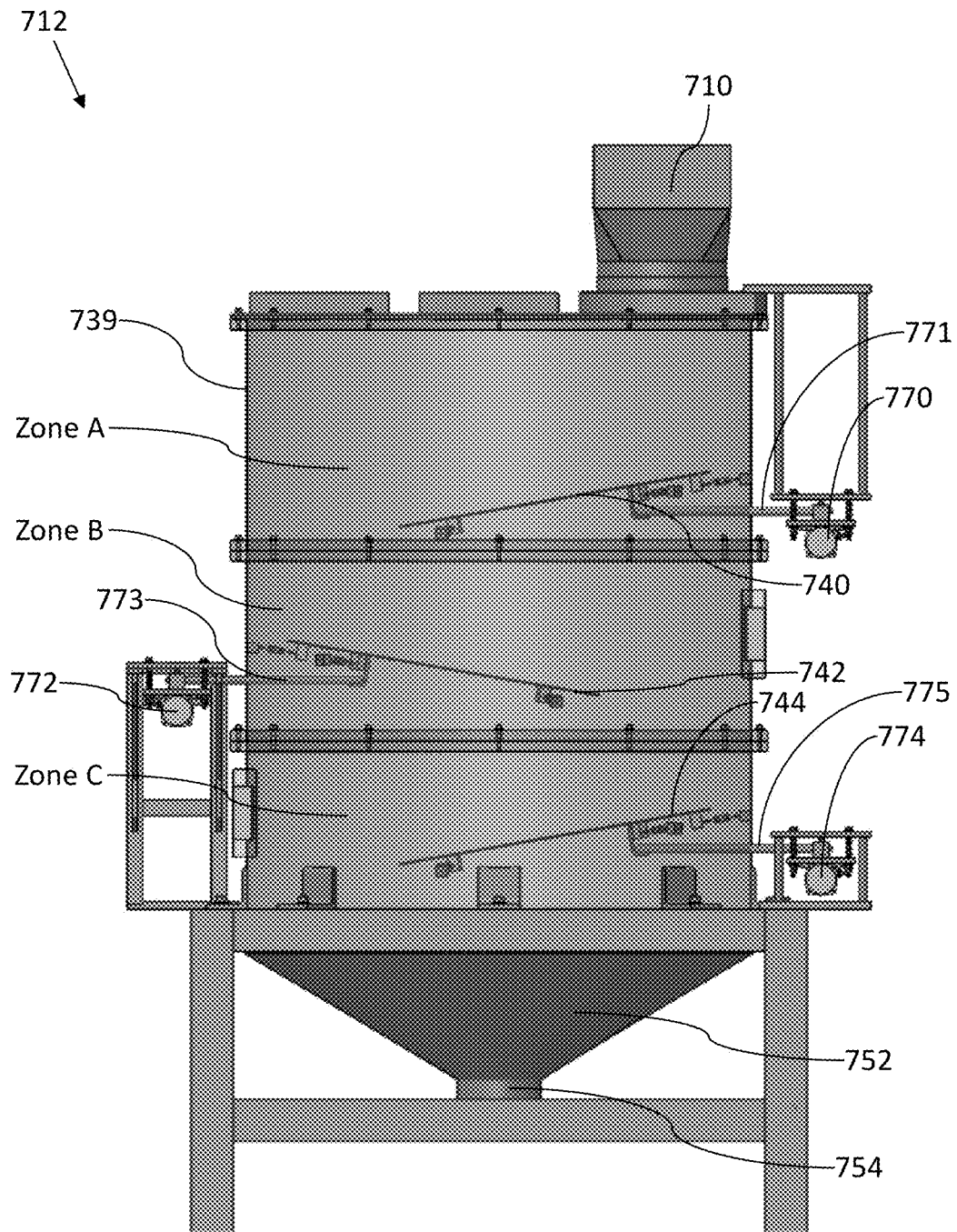
FIG. 7A illustrates a see-through elevation view of microwave applicator box 712.
Figure 7B:
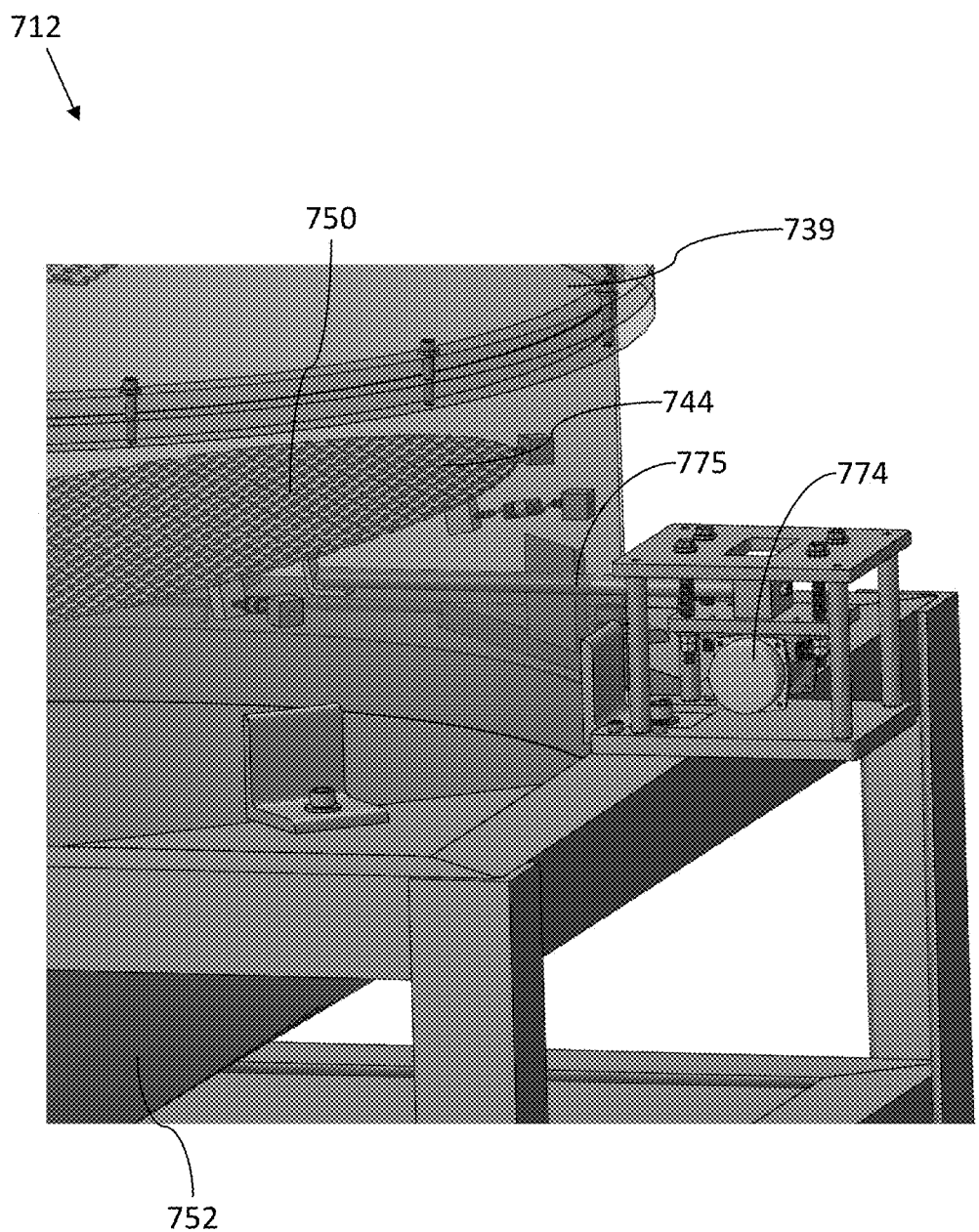
FIG. 7B illustrates a see-through partial perspective view of microwave applicator box 712.
Figure 7C:
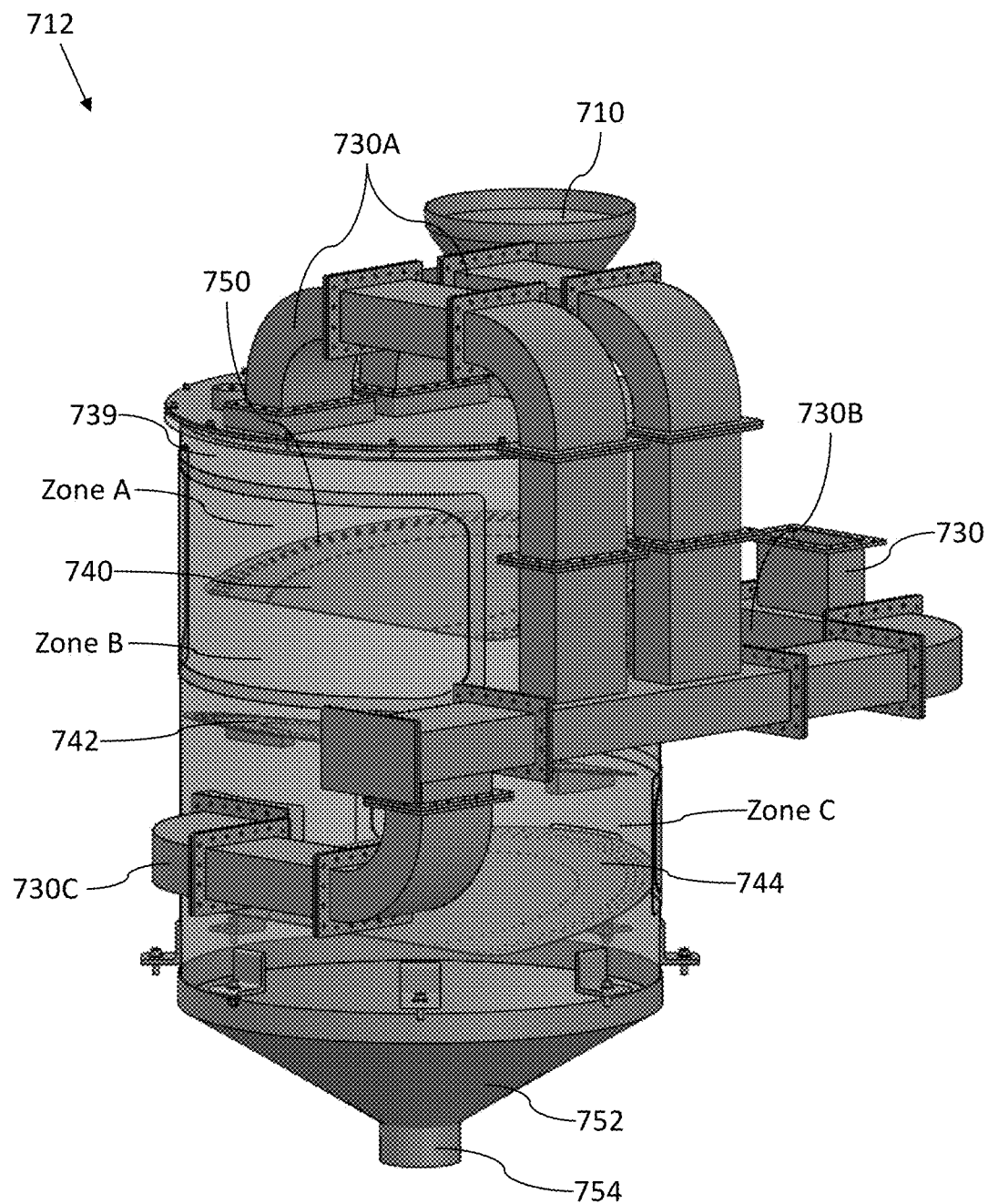
FIG. 7C illustrates a see-through perspective view of microwave applicator box 712.
Figure 7D:
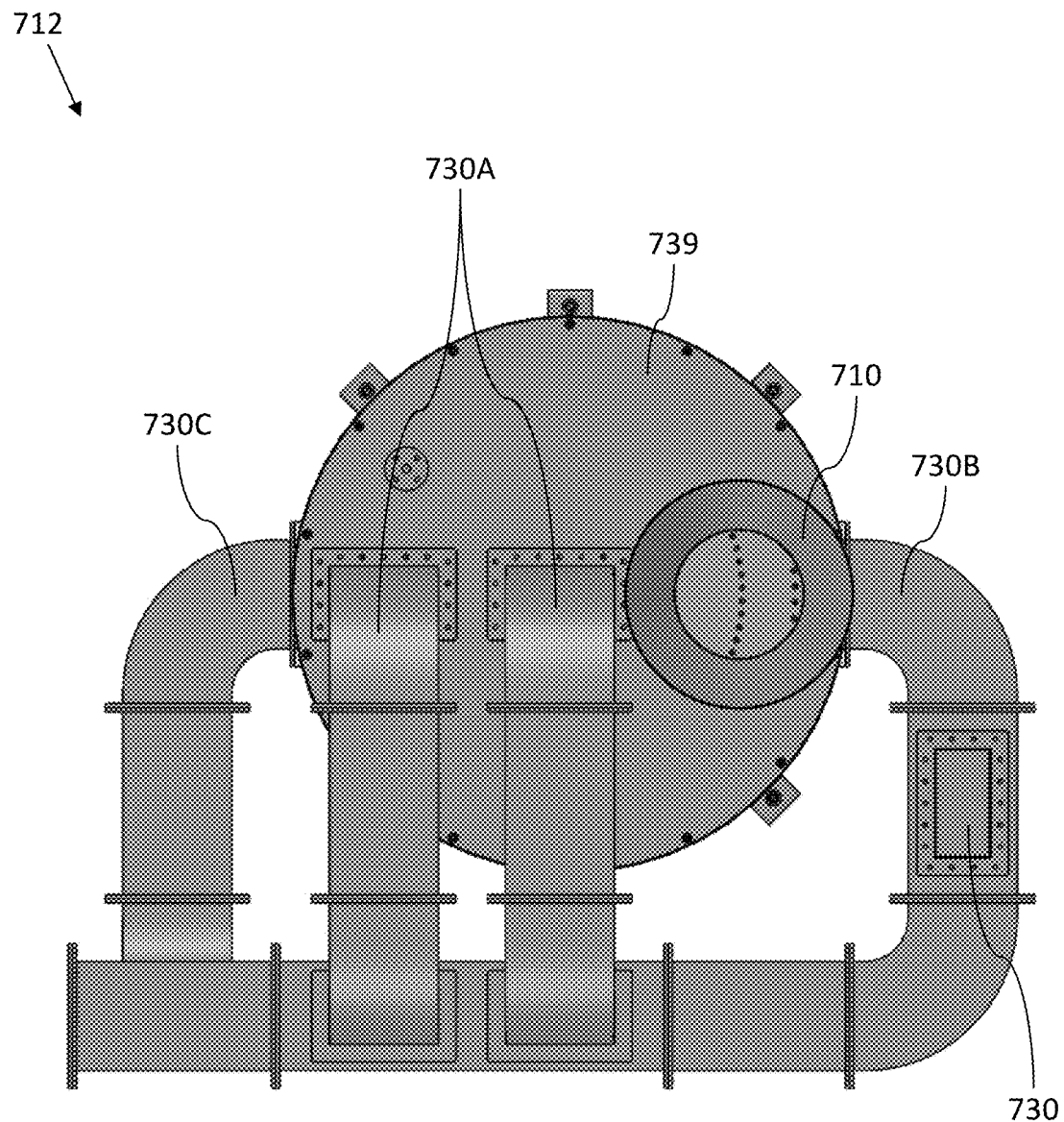
FIG. 7D illustrates a top plan view of microwave applicator box 712.

One notable difference in system 600 as compared to system 100 is the orientation of waveguides 630 extending from microwave generator 614 and into microwave applicator box 612. Specifically, an upper set of bifurcated waveguides 630A are directed into an upper first level (Zone A of FIGS. 7A, 7C), a waveguide 630B directed into a central, second level (Zone B of FIGS. 7A, 7C), and a waveguide 630C directed into a lower, third level (Zone C of FIGS. 7A, 7C) of microwave applicator box 612.

System 600 includes waveguides 630, 630A, 630B, and 630C create an isolated pathway through which microwave energy travels from microwave generator 614 to microwave applicator box 612.

System 600 may include: a base structure 601, a shredder 602, a first conveyor 604, a grinder 606, a second conveyor 608, an inlet valve 610, a microwave applicator box 612, a microwave generator 614, a power distribution panel 616, a primary control unit 620, a grinder 622, a reclamation conveyor 624, a bin 626, a condenser 628, and waveguides 630, 630A, 630B, and 630C.

FIG. 7A-7D illustrates a microwave applicator box 712, which is substantially similar to microwave applicator box 612. Microwave applicator box 712 may include a plurality of singular inclined grates 740, 742, 744. Grates 740, 742, 744 may be organized in an alternating manner, with grate 740 extending from a first side of microwave applicator box 712 and extending past the centerline of microwave applicator box 712, grate 742 extending from a second side of microwave applicator box 712 underlapping grate 740 and extending past the centerline of microwave applicator box 712, and grate 744 extending from the first side of microwave applicator box 712 underlapping grate 742 and extending past the centerline of microwave applicator box 712. The first and second sides of microwave applicator box 712 may be substantially opposite one another. This arrangement may create three tiers of levels such that material received on grate 740 in Zone A via an inlet valve 710 (which may be any of a variety of valve types as described above with respect to inlet valve 110) moves down the slope of grate 740 and onto grate 742 in Zone B, after which that material moves down the slope of grate 742 and onto grate 744 in Zone C, after which that material moves down the slope of grate 744 and into a hopper 752. Material may be removed from hopper 752 via an outlet 754.

A vibration device 770 may be connected to grate 740 via an arm 771. A vibration device 772 may be connected to grate 742 via an arm 773. A vibration device 774 may be connected to grate 744 via an arm 775. Vibration devices 770, 772, 774 may be industrial vibration devices configured to create vibrations and direct the vibrations through arms 771, 773, 775 and into grates 740, 742, 744, respectively. The result is that grates 740, 742, 744 can be caused to vibrate, which may be used to convey feedstock material down the slopes of grates 740, 742, 744.

Additionally, one or more of grates 740, 742, 744 may include perforations 750 extending through the thickness of one or more of grates 740, 742, 744. Perforations 750 in an upper, first level grate 740 may be larger than (a larger cross-sectional area, e.g., larger hole diameter) perforations 750 in a central, second level grate 742. Perforations 750 in a central, second level grate 742 may be larger than perforations 750 in a lower, third level grate 744. The space above the upper, first level grate 740 is referred to as Zone A, the space between the central, second level grate 742 and the upper, first level grate 740 is referred to as Zone B, and the space between lower, third level grate 744 and central, second level grate 742 is referred to as Zone C. Feedstock material of a size larger than perforations 750 in an upper, first level grate 740 may enter the interior of microwave applicator box 712 in Zone A where the feedstock material is exposed to microwave energy. As the feedstock material breaks down due to microwave energy treatment, vibration devices 770, 772, 774 may shift, move, mix, and/or stir the feedstock material until it falls through perforations 750 of grate 740 or off of the lower terminal end of grate 740 and into Zone B. The feedstock material that falls onto a central, second level grate 742 may be larger than perforations 750 in second level grate 742. As the feedstock material breaks down due to microwave energy treatment, vibration devices 770, 772, 774 may shift, move, mix, and/or stir the feedstock material until it falls through perforations 750 of grate 742 or off of the lower terminal end of grate 742 and into Zone C. The feedstock material that falls onto a lower, third level grate 744 may be larger than perforations 750 in third level grate 744. As the feedstock material breaks down due to microwave energy treatment, vibration devices 770, 772, 774 may shift, move, mix, and/or stir the feedstock material until it falls through perforations of grate 744 or off of the lower terminal end of grate 744, and into a hopper 752. Accordingly, feedstock material is classified by material size as it falls through first grate 740, second grate 742, and third grate 744, until the feedstock material drops into hopper 752. Any feedstock material not broken down small enough to fall through perforations 750 or traveling along grates 740, 742, 744 without perforations 750 may simply fall off of the lower terminal end of grates 740, 742, 744 and into the Zone B, C, or hopper 752, below. Feedstock material may exit microwave applicator box 712 and hopper 752 via an outlet 754.

Microwave applicator box 712 may include walls 739, forming one or more of the sides, top, and bottom (hopper 752) of microwave applicator box 712. Walls 739 may define and bound the interior of microwave applicator box 712. At least a portion of the interior of microwave applicator box 712, including at least one of the inner surfaces of walls 739 and grates 740, 742, 744 is coated with a carbon nanotube material. The carbon nanotube material coating may eliminate cold spots and help absorb the microwave energy that is not absorbed by the feedstock material.

Microwave applicator box 712 may be substantially cylindrical in shape without any right angles oriented within the interior of microwave applicator box 712. The interior of microwave applicator box 712 may be substantially devoid or completely devoid of right angles. The interior of microwave applicator box 712 may include welds that are polished smooth and angled at about 45 degrees. Such control of angles may maximize the application of microwave energy inside of microwave applicator box 712 and minimize or mitigate undesired reflection of microwave energy inside of microwave applicator box 712.

Microwave applicator box 712 may include openings in walls 739 corresponding to each of Zones A, B, C. These openings may communicate with the interior of waveguide 730A, 730B, 730C. Waveguide 730A may be bifurcated, such that two waveguides 730A communicate with openings in walls 739 in the area of Zone A such that microwave energy from waveguide 730A is applied directly to Zone A. Waveguide 730B may communicate with an opening in wall 739 in the area of Zone B such that microwave energy from waveguide 730B is applied directly to Zone B. Waveguide 730C may communicate with an opening in wall 739 in the area of Zone C such that microwave energy from waveguide 730C is applied directly to Zone C. A waveguide 730 may connect to waveguides 730A, 730B, 730C, wave guide 730 being connected directly to a microwave generator.

The inlet and outlet of feedstock material from microwave applicator box 712 may be controlled so as to create a constant accumulation of feedstock material in the bottom of hopper 752 (on top of outlet 754) so as to create a barrier to minimize, mitigate, or eliminate loss of inert gas out of outlet 754 and entrance of ambient air (particularly, oxygen) through outlet 754 into the interior of applicator box 712 when outlet 754 is opened to remove processed feedstock material.

Any of the aforementioned microwave applicator boxes may receive a purge gas from a purge gas tank, and may be maintained at a pressure above atmospheric pressure (and above ambient pressure) within the microwave applicator box. In this manner, microwave energy is applied to the interior of the aforementioned microwave applicator boxes in the absence of oxygen, or with a reduced amount of oxygen.

Any of systems 100, 200, 400, 600 may be used to reduce/breakdown feedstock material. Feedstock material may be reduced/broken down via the high temperatures created via the application of microwave energy to the feedstock material. Feedstock material may be waste polymer to be recycled. Feedstock material may be any organic source material.

Alternatively, or additionally, feedstock material may be medical waste, including for example organic waste contaminated with infectious diseases such as COVID-19. The high temperature environment within the microwave application chambers described herein are adequate to destroy any infectious diseases that may be present on used/contaminated medical waste, including COVID-19. Alternatively, or additionally, feedstock material may be any polymeric material contaminated with infectious diseases such as COVID-19, whether medical waste or not. Again, the high temperature environment within the microwave application chambers described herein are adequate to destroy any infectious diseases that may be present on any contaminated materials, including COVID-19.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of alternative aspects thereof, and while the aspects have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A microwave applicator box for breakdown of organic waste materials, comprising:
   an interior defined by at least one wall;
   a plurality of inclined grates organized in an alternating arrangement, including: a first grate extending from a first direction within the interior, and
      a second grate extending from a second direction within the interior and underlapping the first grate;
   a first vibration device connected to the first grate by a first arm extending through the at least one wall, wherein the first vibration device is configured to create a first set of vibrations and direct said first set of vibrations through the first arm and into the first grate;
   a second vibration device connected to the second grate by a second arm extending through the at least one wall, wherein the second vibration device is configured to create a second set of vibrations and direct said second set of vibrations through the second arm and into the second grate;
   wherein the area above the first grate is defined as a Zone A and wherein the area below the first grate and above the second grate is defined as a Zone B;
   wherein a first waveguide is connected to an opening in the at least one wall in the area of the Zone A;
   wherein a second waveguide is connected to an opening in the at least one wall in the area of the Zone B; and wherein an interior of the first waveguide and an interior of the second waveguide are in communication with the interior of the microwave applicator box.

2. The microwave applicator box of claim 1, further comprising a third grate extending from the first direction within the interior and underlapping the second grate.

3. The microwave applicator box of claim 2, further comprising a third vibration device connected to the third grate by a third arm extending through the at least one wall, wherein the third vibration device is configured to create a third set of vibrations and direct said third set of vibrations through the third arm and into the third grate.

4. The microwave applicator box of claim 2, wherein the area below the second guide and above the third grate is defined as a Zone C.

5. The microwave applicator box of claim 4, wherein a first waveguide is connected to an opening in the at least one wall in the area of the Zone C.

6. The microwave applicator box of claim 1, wherein the first waveguide is a bifurcated waveguide.

7. The microwave applicator box of claim 1, further comprising an inlet valve for introducing organic waste materials to the interior of the microwave applicator box, wherein the inlet valve is located above the first grate, and wherein the inlet valve is at least one of a rotary drop-through valve, a rotary valve, and a rotary airlock valve.

8. The microwave applicator box of claim 1, further comprising a hopper below the plurality of inclined grates.

9. The microwave applicator box of claim 8, further comprising an outlet oriented in the hopper.

10. The microwave applicator box of claim 1, further comprising perforations extending through a thickness of at least one of the plurality of inclined grates.

11. A microwave organic waste material treatment system, comprising:
    a microwave generator that creates microwave energy;
    an applicator box for breakdown of the organic waste materials, comprising:
        an interior defined by at least one wall;
        a plurality of inclined grates organized in an alternating arrangement, including:
            a first grate extending from a first direction within the interior, and a second grate extending from a second direction within the interior and underlapping the first grate;
        a first vibration device connected to the first grate by a first arm extending through the at least one wall, wherein the first vibration device is configured to create a first set of vibrations and direct said first set of vibrations through the first arm and into the first grate;
        a second vibration device connected to the second grate by a second arm extending through the at least one wall, wherein the second vibration device is configured to create a second set of vibrations and direct said second set of vibrations through the second arm and into the second grate;
        wherein the area above the first grate is defined as a Zone A and wherein the area below the first grate and above the second grate is defined as a Zone B;
        wherein a first waveguide is connected to an opening in the at least one wall in the area of the Zone A;
        wherein a second waveguide is connected to an opening in the at least one wall in the area of the Zone B;
        wherein an interior of the first waveguide and an interior of the second waveguide are in communication with the interior of the microwave applicator box;
    wherein the microwave generator is connected to the first waveguide and the second waveguide;
    wherein the microwave energy created by the microwave generator travels through the first waveguide and into the Zone A; and
    wherein the microwave energy created by the microwave generator travels through the second waveguide and into the Zone B.

12. The system of claim 11, further comprising a third grate extending from the first direction within the interior and underlapping the second grate.

13. The system of claim 12, further comprising a third vibration device connected to the third grate by a third arm extending through the at least one wall, wherein the third vibration device is configured to create a third set of vibrations and direct said first set of vibrations through the third arm and into the third grate.

14. The system of claim 12, wherein the area below the second guide and above the third grate is defined as a Zone C.

15. The system of claim 14, wherein a first waveguide is connected to an opening in the at least one wall in the area of the Zone C.

16. The system of claim 11, wherein the first waveguide is a bifurcated waveguide.

17. The system of claim 11, further comprising an inlet valve for introducing organic waste materials to the interior of the microwave applicator box, wherein the inlet valve is located above the first grate, and wherein the inlet valve is at least one of a rotary drop-through valve, a rotary valve, and a rotary airlock valve.

18. The system of claim 11, further comprising a hopper below the plurality of inclined grates.

19. The system of claim 18, further comprising an outlet oriented in the hopper.

20. The system of claim 11, further comprising perforations extending through a thickness of at least one of the plurality of inclined grates.

* * * * *